US012776854B2

(12) United States Patent
Yu et al.

(10) Patent No.: US 12,776,854 B2
(45) Date of Patent: Oct. 27, 2026

(54) METHOD FOR SENDING PHYSICAL LAYER PROTOCOL DATA UNIT AND COMMUNICATION APPARATUS

(71) Applicant: Huawei Technologies Co., Ltd., Shenzhen (CN)

(72) Inventors: Jian Yu, Shenzhen (CN); Chenggang Jiang, Shenzhen (CN); Mengshi Hu, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 286 days.

(21) Appl. No.: 18/438,029

(22) Filed: Feb. 9, 2024

(65) Prior Publication Data

US 2024/0235722 A1 Jul. 11, 2024

Related U.S. Application Data

(63) Continuation of application No. PCT/CN2022/111407, filed on Aug. 10, 2022.

(30) Foreign Application Priority Data

Aug. 18, 2021 (CN) ......................... 202110949948.1

(51) Int. Cl.
*H04W 56/00* (2009.01)
*H04L 1/00* (2006.01)

(52) U.S. Cl.
CPC .......... *H04L 1/0008* (2013.01); *H04L 1/0063* (2013.01); *H04W 56/0045* (2013.01)

(58) Field of Classification Search
CPC . H04L 1/0008; H04L 1/0063; H04W 56/0045
See application file for complete search history.

(56) References Cited

U.S. PATENT DOCUMENTS 9,503,932 B2 * 11/2016 Vermani ............. H04L 27/0012
2016/0029373 A1 * 1/2016 Seok ......................... H04L 1/16 370/338

(Continued)

FOREIGN PATENT DOCUMENTS

CN 112187427 A 1/2021
CN 112470422 A 3/2021

(Continued)

OTHER PUBLICATIONS

Matthew Fischer, "MLO Synchronous Transmission." doc.: IEEE 802.11-20/0081r1, Jan. 2020, total 59 pages.

(Continued)

*Primary Examiner* — Fahmida S Chowdhury
(74) *Attorney, Agent, or Firm* — Conley Rose, P.C.

(57) ABSTRACT

A method for sending a physical layer protocol data unit (PPDU) may be applied to some scenarios in which PPDU alignment is implemented. For example, in multi-link transmission of non-simultaneous transmit and receive, it is ensured that a time error of simultaneous ending of a plurality of PPDUs does not exceed 8 microseconds. In the method, a transmitter controls duration of one or more fields of a packet extension (PE) field, an Extremely High Throughput (EHT)-signal (SIG) field, and an EHT-long training field (LTF) field of the PPDU, and/or delays a sending time of the PPDU so that an error between an end time of the PPDU and a specific time (for example, a first time) is not greater than an error threshold, thereby implementing PPDU alignment.

20 Claims, 19 Drawing Sheets

(56) References Cited

U.S. PATENT DOCUMENTS

| | | | | |
|---|---|---|---|---|
| 2016/0302199 | A1* | 10/2016 | Bharadwaj | H04L 1/0042 |
| 2016/0323848 | A1 | 11/2016 | Azizi et al. | |
| 2016/0374017 | A1* | 12/2016 | Stacey | H04W 52/0216 |
| 2017/0201981 | A1* | 7/2017 | Huang | H04W 74/0816 |
| 2018/0102929 | A1 | 4/2018 | Lin et al. | |
| 2019/0313404 | A1 | 10/2019 | Chu et al. | |
| 2020/0015271 | A1* | 1/2020 | Lee | H04L 27/2602 |
| 2020/0045656 | A1* | 2/2020 | Verma | H04J 3/067 |
| 2020/0136764 | A1* | 4/2020 | Zhang | H04L 1/0057 |
| 2020/0177425 | A1* | 6/2020 | Chen | H04L 27/2602 |
| 2021/0014811 | A1* | 1/2021 | Seok | H04W 56/0005 |
| 2021/0084686 | A1* | 3/2021 | Zhang | H04B 7/0617 |
| 2021/0099256 | A1* | 4/2021 | Lee | H04L 1/1893 |
| 2021/0136819 | A1* | 5/2021 | Seok | H04L 1/0007 |
| 2021/0307069 | A1* | 9/2021 | Xin | H04B 7/0617 |
| 2021/0315025 | A1* | 10/2021 | Seok | H04L 1/0008 |
| 2021/0337564 | A1* | 10/2021 | Kwon | H04W 72/0446 |
| 2021/0377368 | A1* | 12/2021 | Han | H04L 69/18 |
| 2022/0030604 | A1* | 1/2022 | Noh | H04W 72/121 |
| 2022/0224579 | A1* | 7/2022 | Raissinia | H04L 69/323 |
| 2022/0393792 | A1* | 12/2022 | Lim | H04L 1/0063 |
| 2022/0417074 | A1* | 12/2022 | Lim | H04L 1/08 |
| 2023/0133677 | A1* | 5/2023 | Sun | H04L 1/0067 370/328 |
| 2023/0198696 | A1* | 6/2023 | Huang | H04L 1/0041 370/329 |
| 2023/0300803 | A1* | 9/2023 | Huang | H04L 5/0007 370/330 |
| 2024/0121143 | A1* | 4/2024 | Huang | H04B 7/0452 |

FOREIGN PATENT DOCUMENTS

| | | | | |
|---|---|---|---|---|
| CN | 113596927 | A | 11/2021 | |
| EP | 4475502 | A2 * | 12/2024 | H04W 72/044 |
| WO | 2015077068 | A1 | 5/2015 | |
| WO | 2020096349 | A1 | 5/2020 | |

OTHER PUBLICATIONS

Yongho Seok et al, "Synchronous Multi-Link Transmission," doc.: IEEE 802.11-19/1305r0, Jan. 2020, total 12 pages.

Dmitry Akhmetov et al, "Follow up of discussion on multi-link operation with leakage on non-AP MLD," doc.: IEEE 802.11-20/0106r3, Mar. 11, 2020, total 27 pages.

IEEE P802.11ax ™M/D8.0, Oct. 2020,Part 11:Wireless LAN Medium Access Control (MAC) and Physical Layer (PHY) Specifications,Amendment 1: Enhancements for High Efficiency WLAN, total 820 pages.

IEEE Std 802.11ac™—2013,IEEE Standard for Information technology—Telecommunications and information exchange between systems Local and metropolitan area networks—Specific requirements,Part 11:Wireless LAN Medium Access Control (MAC) and Physical Layer (PHY) Specifications, Amendment 4:Enhancements for Very High Throughput for Operation in Bands below 6 GHz,Approved Dec. 11, 2013,total 425 pages.

IEEE Std 802.11b-1999/Cor Jan. 2001 (Corrigendum to IEEE Std 802.11b-1999),IEEE Standard forInformation technology—Telecommunications and informationexchange between systems—Local and metropolitan area networks Specific requirementsPart 11:Wireless LAN Medium Access Control(MAC) and Physical Layer (PHY) specifications Amendment 2:Higher-speed Physical Layer (PHY)extension in the 2.4 GHz band—Corrigendum 1,Nov. 7, 2001, total 24 pages.

IEEE Std 802.11n™—2009 Part 11:Wireless LAN Medium Access Control (MAC) and Physical Layer (PHY) Specifications Amendment 5:Enhancements for Higher Throughput,IEEE Computer Society,dated Sep. 11, 2009, total 536 pages.

IEEE Std 802.11a—1999(Supplement to IEEE Std 802.11—1999),Supplement to IEEE Standard for Information technology—Telecommunications and information exchange between systems—Local and metropolitan area networks Specific requirements—Part 11:Wireless LAN Medium Access Control(MAC) and Physical Layer (PHY) specifications:High-speed Physical Layer in the 5 GHZ Band,Approved Sep. 16, 1999,total 90 pages.

IEEE P802.11be/D0.3,Draft Standard for Information technology—Tele-communications and information exchange between systems Local and metropolitan area networks—Specific requirements Part 11:Wireless LAN Medium Access Control (MAC) and Physical Layer (PHY) Specifications Amendment 8:Enhancements for extremely high throughput (EHT),Jan. 2021,total 196 pages.

IEEE Std 802.11g™—2003 (Amendment to IEEE Std 802.11™,1999 Edition (Reaff 2003),IEEE Standard for Information technology—Telecommunications and information exchange between systems—Local and metropolitan area networks—Specific requirementsPart 11:Wireless LAN Medium Access Control (MAC) and Physical Layer (PHY) specifications Amendment 4:Further Higher Data Rate Extension in the 2.4 GHz Band,Jun. 27, 2003,total 77 pages.

Yunbo Li et al., "PPDU alignment in STR constrained multi-link," IEEE 802.11-20/0433r5, Mar. 15, 2020, total 19 pages.

I"EEE P802.11 be™/D1.0,Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT)," May 2021, XP068255523, total 635 pages.

Yongho Seok et al., "Synchronous Multi-Link Transmission," doc. :IEEE 802.11-19/1305r0, Jan. 2020, XP068172546, total 12 pages.

* cited by examiner

FIG. 13
L-STF
L-LTF
L-SIG
RL-SIG
U-SIG
EHT-SIG
Padding part of the EHT-SIG
EHT-STF
EHT-LTF
Data
PE

METHOD FOR SENDING PHYSICAL LAYER PROTOCOL DATA UNIT AND COMMUNICATION APPARATUS

CROSS-REFERENCE TO RELATED APPLICATIONS

This is a continuation of International Patent Application No. PCT/CN2022/111407 filed on Aug. 10, 2022, which claims priority to Chinese Patent Application No. 202110949948.1 filed on Aug. 18, 2021. The disclosures of the aforementioned applications are hereby incorporated by reference in their entireties.

TECHNICAL FIELD

This disclosure relates to the field of a wireless local area network (WLAN), and in particular, to a method for sending a physical layer protocol data unit and a communication apparatus in a WLAN.

BACKGROUND

A WLAN starts from 802.11a/b/g and evolves from 802.11n, 802.11ac, and 802.11ax to 802.11be that is being discussed in the industry. There are two Extremely High Throughput (EHT) physical layer protocol data unit (PPDU) formats defined in the 802.11be: an EHT multiple user (MU) PPDU and an EHT trigger-based (TB) PPDU. The EHT MU PPDU may support single-user (downlink or uplink) and multi-user (downlink) data transmission. The EHT TB PPDU is a PPDU that is triggered to be sent by one or more stations (STAs) based on scheduling information in a trigger frame sent by an access point (AP).

However, in wireless communication, there are many scenarios in which PPDU alignment is useful. To be specific, a time interval between a PPDU end time and a target end time is less than a specific error threshold. For example, in multi-link (ML) transmission of non-simultaneous transmit and receive (non-STR), a time error of simultaneous ending of PPDUs on multiple links (for example, a link 1 and a link 2) is generally not to exceed 8 microseconds. However, when there are trigger frames in PPDUs on different links, and carrier monitoring is performed before sending of a TB PPDU that is triggered by the trigger frames, a time error of simultaneous ending of the PPDUs on the different links is generally not to exceed 4 microseconds.

However, time limitation is not considered in coding procedures of an existing EHT MU PPDU and an existing EHT TB PPDU. For example, PPDUs on different links are encoded based on respective required duration. In a current situation, a requirement on PPDU alignment cannot be met.

SUMMARY

This disclosure provides a method for sending a PPDU and a communication apparatus, to implement PPDU alignment.

According to a first aspect, a method for sending a PPDU is provided. The method may be applied to a transmitter for wireless communication, or may be applied to a chip or a chip system of a transmitter. The following uses a transmitter as an example. The method includes the following. The transmitter controls duration of one or more fields of a packet extension (PE) field, an EHT-signal (EHT-SIG) field, and an EHT-long training field (EHT-LTF) field of a first PPDU, and/or delays a sending time of the first PPDU, so that an error between an end time of the first PPDU and a first time is not greater than an error threshold, and the transmitter sends the first PPDU.

In the technical solution of this disclosure, the transmitter controls the duration of one or more fields of the PE field, the EHT-SIG field, and the EHT-LTF field of the PPDU (for example, the first PPDU), and/or delays the sending time of the PPDU, so that the error between the end time of the PPDU and a specific time (for example, the first time) is not greater than the error threshold, to align the end time of the PPDU with the first time.

The solution in this disclosure is applicable to sending of a PPDU in some scenarios with time limitation (or a scenario in which PPDU alignment is required), for example, ML transmission of non-STR.

With reference to the first aspect, in some implementations of the first aspect, the first PPDU includes a preamble, a data field, and the PE field, duration of the PE field is determined based on first duration, duration of the preamble of the first PPDU, and duration of a symbol in the data field, and the first duration is duration between the first time and a start time of the first PPDU.

In this implementation, considering that a duration granularity of the PE field is a multiple of 4 microseconds, alignment between the end time of the first PPDU and the first time is implemented by using the duration of the PE field. This can meet an alignment condition with a relatively small error threshold. For example, the error threshold is 4 microseconds or 8 microseconds.

With reference to the first aspect, in some implementations of the first aspect, a quantity of symbols in the data field is determined based on the first duration, the duration of the preamble, and the duration of the symbol in the data field.

With reference to the first aspect, in some implementations of the first aspect, the first PPDU includes a preamble, a data field, and the PE field, the preamble includes the EHT-SIG field, and the EHT-SIG field includes an initial part and a padding part.

Duration of the padding part in the EHT-SIG field is determined based on first duration, initial duration of the preamble, duration of the PE field, and duration of a symbol in the data field, the initial duration of the preamble does not include the duration of the padding part in the EHT-SIG field, and the first duration is duration between the first time and a start time of the first PPDU.

The duration of the padding part is a multiple of 4 microseconds.

In this implementation, considering that duration of one symbol in the EHT-SIG field is 4 microseconds, and the EHT-SIG field allows all symbols to be padding bits, the EHT-SIG field is padded, so that the end time of the first PPDU can be aligned with the first time. In addition, compared with alignment of the first PPDU by using the PE field, the duration of the PE field can be shortened and selection of a pre-forward error correction (FEC) padding factor can be simplified.

With reference to the first aspect, in some implementations of the first aspect, a quantity of symbols in the data field is determined based on the first duration, the initial duration of the preamble, the duration of the PE field, and the duration of the symbol in the data field.

With reference to the first aspect, in some implementations of the first aspect, the EHT-SIG field of the first PPDU carries a low-density parity check (LDPC) extra symbol segment field, where the LDPC extra symbol segment field is set to be a second value, the EHT-SIG field carries a second pre-forward error correction padding factor, the second value indicates that no LDPC extra symbol segment is to be added, the LDPC extra symbol segment field is set when an LDPC extra symbol segment condition is not met, and the LDPC extra symbol segment condition is set based on the second pre-forward error correction padding factor. The second pre-forward error correction padding factor is determined based on the duration of the PE field and a nominal packet padding capability of a receiver.

In an implementation, the transmitter selects the duration of the PE field of the first PPDU based on a limitation on the first time. Further, the transmitter selects the second pre-forward error correction padding factor based on the selected duration of the PE field and the nominal packet padding capability of the receiver, determines, based on the second pre-forward error correction padding factor, whether the LDPC extra symbol segment condition is met, and sets the LDPC extra symbol segment field if the LDPC extra symbol segment condition is not met. In this implementation, alignment between the end time of the first PPDU and the first time can be ensured, and sending of the PPDU in a scenario in which PPDU alignment is required can be met.

With reference to the first aspect, in some implementations of the first aspect, the EHT-SIG field of the first PPDU carries an LDPC extra symbol segment field, where the LDPC extra symbol segment field is set to be a first value, the EHT-SIG field carries a second pre-forward error correction padding factor, the first value indicates that an LDPC extra symbol segment is to be added, the LDPC extra symbol segment field is set when an LDPC extra symbol segment condition is met, and the LDPC extra symbol segment condition is set based on a first pre-forward error correction padding factor. The first pre-forward error correction padding factor is determined based on the duration of the PE field and a nominal packet padding capability of a receiver.

In an implementation, the transmitter selects the duration of the PE field of the first PPDU based on a limitation on the first time. Further, the transmitter selects the second pre-forward error correction padding factor based on the selected duration of the PE field and the nominal packet padding capability of the receiver, and determines the first pre-forward error correction padding factor based on the second pre-forward error correction padding factor. The transmitter determines, based on the first pre-forward error correction padding factor, whether the LDPC extra symbol segment condition is met, and sets the LDPC extra symbol segment field if the LDPC extra symbol segment condition is met. In this implementation, alignment between the end time of the first PPDU and the first time can be ensured, and sending of the PPDU in a scenario in which PPDU alignment is required can be met.

With reference to the first aspect, in some implementations of the first aspect, the EHT-SIG field of the first PPDU carries an LDPC extra symbol segment field, where the LDPC extra symbol segment field is set to be a second value, the EHT-SIG field carries a first pre-forward error correction padding factor, the second value indicates that no LDPC extra symbol segment is to be added, the LDPC extra symbol segment field is set when an LDPC extra symbol segment condition is not met, and the LDPC extra symbol segment condition is set based on the first pre-forward error correction padding factor. The first pre-forward error correction padding factor is determined based on the duration of the PE field and a nominal packet padding capability of a receiver.

In an implementation, the transmitter selects the duration of the PE field of the first PPDU based on a limitation on the first time. Further, the transmitter selects the second pre-forward error correction padding factor based on the selected duration of the PE field and the nominal packet padding capability of the receiver, and determines the first pre-forward error correction padding factor based on the second pre-forward error correction padding factor. The transmitter determines, based on the first pre-forward error correction padding factor, whether the LDPC extra symbol segment condition is met, and sets the LDPC extra symbol segment field if the LDPC extra symbol segment condition is not met. In this implementation, alignment between the end time of the first PPDU and the first time can be ensured, and sending of the PPDU in a scenario in which PPDU alignment is required can be met.

In the foregoing several implementations, the first pre-forward error correction padding factor is determined based on the second pre-forward error correction padding factor. The first PPDU is encoded by using the first pre-forward error correction padding factor, so that duration that can be used by the receiver to decode the first PPDU is prolonged in comparison with a case in which the first PPDU is encoded by using the second pre-forward error correction padding factor.

With reference to the first aspect, in some implementations of the first aspect, the EHT-SIG field of the first PPDU carries an LDPC extra symbol segment field, where the LDPC extra symbol segment field is set to be a first value, the EHT-SIG field carries a second pre-forward error correction padding factor, the first value indicates that an LDPC extra symbol segment is to be added, and the second pre-forward error correction padding factor is determined based on the duration of the PE field and a nominal packet padding capability of a receiver.

In this implementation, based on a limitation of the first time. The transmitter selects the duration of the PE field, and selects the second pre-forward error correction padding factor based on the selected duration of the PE field and a requirement on the nominal packet padding capability of the receiver. On this basis, the LDPC extra symbol segment condition is met by default and the transmitter sets the LDPC extra symbol segment field. Compared with another implementation in which the transmitter calculates whether the LDPC extra symbol segment condition is met to further determine the pre-forward error correction padding factor, in this implementation, a procedure of selecting the pre-forward error correction padding factor is greatly simplified, and calculation complexity and a calculation amount are reduced.

In addition, for example, in the foregoing implementations, the first value may be "1", and the second value may be "0". It is clear that the first value and the second value may further be set to other values or characters, to identify whether the LDPC extra symbol segment is added. This is not limited.

With reference to the first aspect, in some implementations of the first aspect, the first pre-forward error correction padding factor and the second pre-forward error correction padding factor meet the following formula:

$$\begin{cases} a1 = 4, & a2 = 1 \\ a1 = a2 - 1, & a2 = 2, 3, 4 \end{cases},$$

where a1 represents the first pre-forward error correction padding factor, and a2 represents the second pre-forward error correction padding factor.

With reference to the first aspect, in some implementations of the first aspect, the duration of the PE field is increased by 4 microseconds, and the duration of the PE field is increased by 4 microseconds in the following case: when an LDPC extra symbol segment condition is met, a requirement on a nominal packet padding capability of a receiver is not met after an LDPC extra symbol segment is added, remaining duration is greater than or equal to 4 microseconds, and the duration of the PE field does not reach allowed maximum duration.

The LDPC extra symbol segment condition is set based on a second pre-forward error correction padding factor, and the second pre-forward error correction padding factor is determined based on the duration of the PE field obtained before 4 microseconds are added and the nominal packet padding capability of the receiver, and the remaining duration is determined based on the first duration, the duration of the preamble, the duration of the symbol in the data field, and the duration of the PE field obtained before 4 microseconds are added.

In this implementation, the transmitter pads the EHT-SIG field based on a limitation on the first time, to align the end time of the first PPDU with the first time. The duration of the PE field may be freely selected, and is more flexible.

According to a second aspect, a communication apparatus is provided. The communication apparatus has a function of implementing the method according to the first aspect or any one of the possible implementations of the first aspect. The function may be implemented by hardware, or may be implemented by hardware executing corresponding software. The hardware or the software includes one or more units corresponding to the foregoing function.

According to a third aspect, a communication apparatus is provided, including a processor and a memory. Optionally, the communication apparatus may further include a transceiver. The memory is configured to store a computer program. The processor is configured to invoke and run the computer program stored in the memory, and control the transceiver to send and receive a signal, so that the communication apparatus performs the method according to the first aspect or any one of the possible implementations of the first aspect.

For example, the communication apparatus is a transmitter for wireless communication.

According to a fourth aspect, a communication apparatus is provided, including a processor and a communication interface. The communication interface is configured to receive data and/or information, and transmit the received data and/or information to the processor, the processor processes the data and/or information, and the communication interface is further configured to output data and/or information processed by the processor, so that the method according to the first aspect or any one of the possible implementations of the first aspect is performed.

According to a fifth aspect, a computer-readable storage medium is provided. The computer-readable storage medium stores computer instructions, and when the computer instructions are run on a computer, the method according to the first aspect or any one of the possible implementations of the first aspect is performed.

According to a sixth aspect, a computer program product is provided. The computer program product includes computer program code, and when the computer program code is run on a computer, the method according to the first aspect or any one of the possible implementations of the first aspect is performed.

According to a seventh aspect, a chip is provided. The chip includes a processor, a memory configured to store a computer program is disposed independently from the chip, and the processor is configured to execute the computer program stored in the memory, so that a device on which the chip is installed performs the method according to the first aspect or any one of the possible implementations of the first aspect.

Optionally, the processor may be a processing circuit or a logic circuit.

Further, the chip may include a communication interface. The communication interface may be an input/output interface, an interface circuit, or the like. Further, the chip may include the memory.

Optionally, there may be one or more processors, and there may be one or more memories.

According to an eighth aspect, a communication system is provided, including the communication apparatus (for example, the transmitter in this embodiment of this disclosure) according to any one of the second aspect to the fourth aspect, and one or more other communication apparatuses that communicate with the communication apparatus.

DESCRIPTION OF EMBODIMENTS

The following describes technical solutions of embodiments in this disclosure with reference to accompanying drawings.

In a WLAN communication standard 802.11be, two types of EHT PPDU formats are defined, namely, an EHT MU PPDU and an EHT TB PPDU. The EHT MU PPDU may support single-user (downlink or uplink) and multi-user (downlink) data transmission. The EHT TB PPDU is a PPDU that is triggered to be sent by one or more STAs based on scheduling information in a trigger frame sent by an AP.

Figure 1:
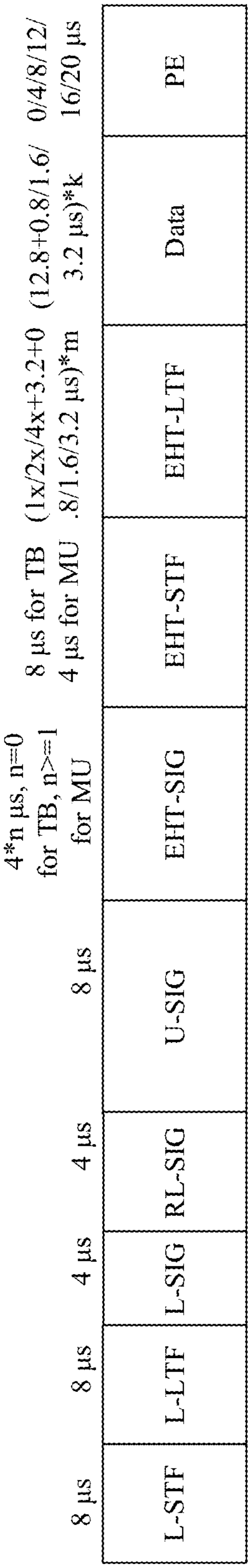
FIG. 1 depicts an EHT PPDU format according to this disclosure.

FIG. 1 shows an EHT PPDU format according to this disclosure. For meanings, functions, and duration of the fields in FIG. 1, refer to Table 1.

TABLE 1

| Acronyms and abbreviations | English full name | Chinese full name | Functions | Duration |
|---|---|---|---|---|
| L-STF | Legacy short training field | Legacy short training field | Used for PPDU discovery, coarse synchronization, and automatic gain control | 2 symbols with 8 microseconds in total |
| L-LTF | Legacy long training field | Legacy long training field | Used for fine synchronization and channel estimation | 2 symbols with 8 microseconds in total |
| L-SIG | Legacy signal field | Legacy signal field | Used for carrying signaling information related to a length of a PPDU, to ensure coexistence | 1 symbol with 4 microseconds |
| RL-SIG | Repeated legacy signal field | Repeated legacy signal field | Used for carrying signaling information related to a length of a PPDU, to ensure coexistence | 1 symbol with 4 microseconds |
| U-SIG | Universal SIG | Universal signal field | Similar to an HE-SIG-A, a difference lies in that, from the generation of an EHT PPDU, a universal signal field is used in a subsequent standard, and therefore is referred to as a universal signal field | 2 symbols with 8 microseconds in total |
| EHT-SIG | Extremely high throughput signal field | Extremely high throughput signal field | Used for carrying signaling for demodulating subsequent data, mainly including resource unit indication information | This field exists only in an EHT MU PPDU, and a quantity n of symbols is variable. There are 1 to 32 symbols, and each symbol has 4 microseconds. For an EHT TB PPDU, it may be understood that a quantity n of symbols is 0. |
| EHT-STF | Extremely high throughput short training field | Extremely high throughput short training field | Used for automatic gain control over a subsequent field | EHT MU PPDU: 1 symbol with 4 microseconds; and EHT TB PPDU: 1 symbol with 8 microseconds |
| EHT-LTF | Extremely high throughput long training field | Extremely high throughput long training field | Used for channel estimation | A quantity m of symbols is variable, and a length of each symbol is also variable. In addition to a guard interval (GI), there are three lengths of each symbol: 1x (3.2 microseconds), 2x (6.4 microseconds), and 4x (12.8 microseconds). The length of the guard interval is also classified into three types: 0.8 microseconds, 1.6 microseconds, and 3.2 microseconds. A total length of the EHT-LTF is: $(T_{GI} + T_{EHT\text{-}LTF\text{-}noGI})*m$ |

TABLE 1-continued

| Acronyms and abbreviations | English full name | Chinese full name | Functions | Duration |
|---|---|---|---|---|
| Data | | Data | Used for carrying data information | A quantity k of symbols is variable, and a length of each symbol is also variable. In addition to a guard interval (GI), the length of each symbol is 12.8 microseconds. The length of the guard interval is also classified into three types: 0.8 microseconds, 1.6 microseconds, and 3.2 microseconds. A total length of the EHT-LTF: $(T_{GI} + 12.8)*k$ |
| PE | Packet extension | Packet extension | Used for increasing processing time of a receiver | The length is variable, and can be 0, 4, 8, 12, 16, or 20 microseconds. |

In Table 1, * represents a multiplication operation.

1. Coding Procedure of an EHT MU PPDU.

Figure 2:
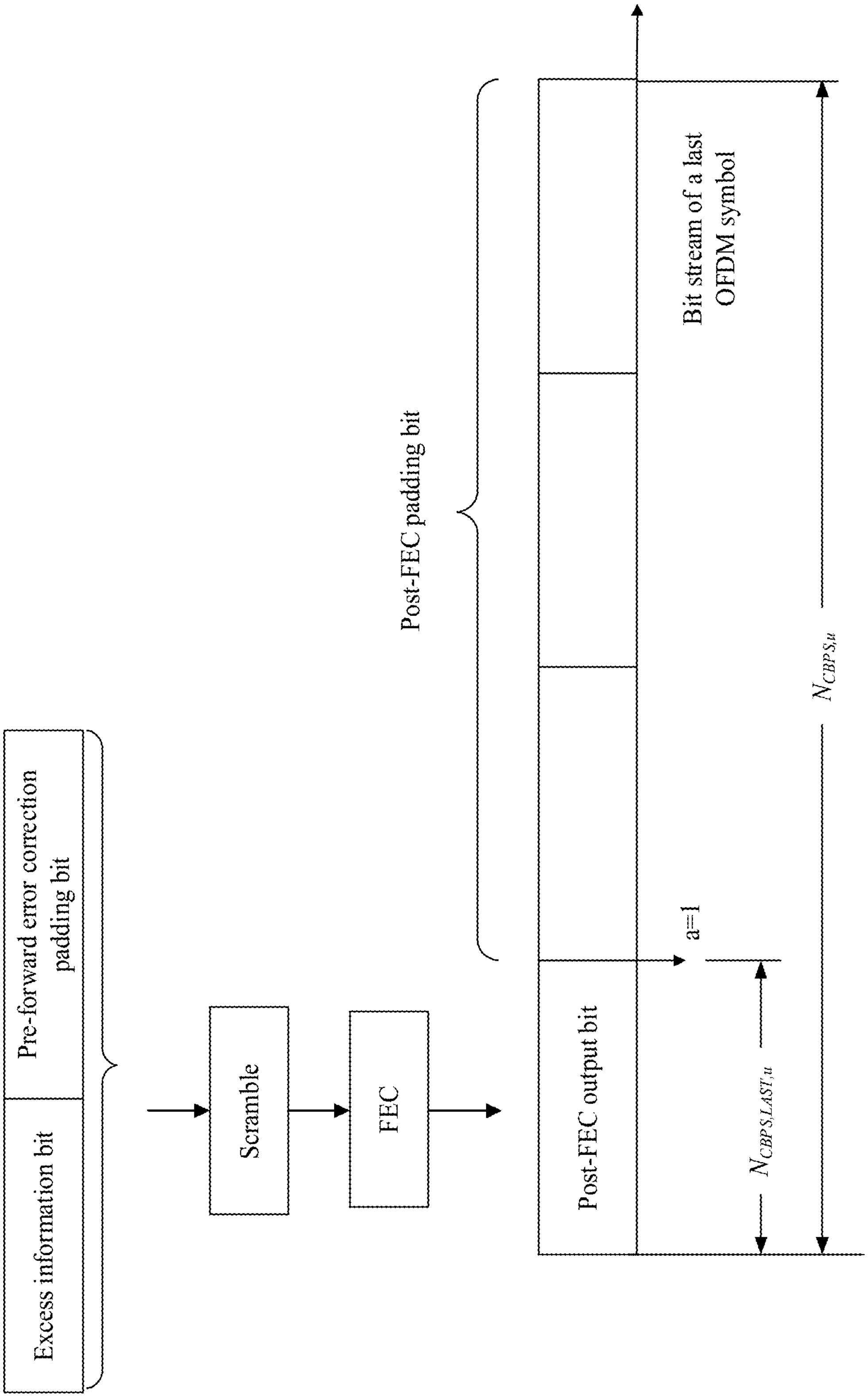
FIG. 2 depicts a coding procedure of an EHT MU PPDU according to this disclosure.

FIG. 2 shows a coding procedure of an EHT MU PPDU according to this disclosure. As shown in FIG. 2, a media access control (MAC) layer of a transmitter determines a quantity of bytes to be transmitted by one or more users. The transmitter encodes information bits of a corresponding quantity of bytes of each user in a unit of an orthogonal frequency-division multiplexing (OFDM) symbol. A last symbol of the EHT PPDU is performed on segment padding processing, as shown in FIG. 2.

It should be understood that FIG. 2 shows the last symbol that is involved in coding. Not all subcarriers of the symbol are involved in coding, but only bits of some segments may be involved in coding. In such an operation, a receiver may decode only some subcarriers during decoding, thereby saving processing time. The receiver does not process bits of another segment of the last symbol, and more processing time may be reserved for the receiver to process bits that have not been processed before. In addition, there may be a PE field after the last symbol, and the PE field is not processed by the receiver. More processing time may be reserved for the receiver.

Meanings of information in FIG. 2 are as follows.

Excess information bits: Information bits included in a last symbol of an EHT PPDU.

Pre-FEC bits: Padding bits involved in coding.

Post-FEC output bits: Output bits after scrambling and FEC.

Scrambling and FEC: Indicate scrambling and forward error correction respectively.

Post-FEC padding bits: Indicate a quantity of bits required by a total quantity of encoded bits that further are to be padded to a symbol after coding. It should be understood that the total quantity of bits is a quantity of bits included in one symbol. The post-FEC padding bits are not involved in coding, and are not processed by the receiver.

$N_{CBPS,Last,u}$: Indicates a quantity of encoded bits of a last symbol.

$N_{CBPS,u}$: Indicates a quantity of encoded bits of a symbol (not the last symbol). In addition, a represents a captured position of coding, and may be referred to as a pre-FEC padding factor. There are four captured positions in total, that is, a=1, 2, 3, and 4, respectively indicating that output bits after FEC coding occupy about 1/4, 2/4, 3/4, and 1 of the entire symbol, and respectively correspond to one, two, three, and four segments of the last symbol. In other words, when a=4, all subcarriers are involved in coding.

The following describes in detail the coding procedure of the EHT PPDU with reference to the procedure in FIG. 2.

(1) For the EHT MU PPDU, a transmitter first calculates, according to formula (1), a quantity of bits that are exceeded in a last data symbol for each user (for example, an $u^{th}$ user), that is, excess information bits.

$$N_{excess,u} = \mathrm{mod}(8 \cdot \mathrm{APEP\_LENGTH}_u + N_{tail} + N_{service}, N_{DBPS,u}) \quad (1)$$

In the formula (1), $N_{excess,u}$ represents a quantity of excess information bits existing in the last data symbol of the $u^{th}$ user.

$\mathrm{APEP\_LENGTH}_u$ represents a quantity of padding bytes (pre-end of frame padding) before an end of an $u^{th}$ user aggregated-MAC protocol data unit (A-MPDU) frame, and may be understood as a quantity of bytes of useful information bits to be transmitted at a MAC layer.

$N_{tail}$ represents coded tail bits, and for binary convolutional coding (BCC), the value is 6, and for LDPC, the value is 0.

$N_{service}$ is a quantity of bits of a service field, and the value is 16.

$N_{DBPS,u}$ is a quantity of bits included in each symbol of the $u^{th}$ user.

(2) The transmitter calculates a quantity of initial segments of the last OFDM symbol and a quantity of initial OFDM symbols according to $N_{excess,u}$, a formula (2), and a formula (3).

$$a_{init,u} = \begin{cases} 4, & \text{if } N_{excess,u} = 0 \\ \min\left(\left\lceil \frac{N_{excess,u}}{N_{DBPS,short,u}} \right\rceil, 4\right), & \text{otherwise} \end{cases} \quad (2)$$

$$N_{STM,init,u} = \left\lceil \frac{8 \cdot \mathrm{APEP\_LENGTH}_u + N_{tail} + N_{service}}{N_{DBPS,u}} \right\rceil \quad (3)$$

$N_{DBPS,short,u} = N_{CBPS,short,u} \cdot R_u$, and $R_u$ is a bit rate of the $u^{th}$ user.

$N_{CBPS,short,u} = N_{SD,short,u} \cdot N_{SS,u} \cdot N_{BPSCS,u}$.

$N_{SD,short,u}$ is a quantity of information bits carried in a segment in a last symbol that is predefined in a communication protocol standard for a corresponding resource unit (RU) or multiple resource unit (MRU), $N_{SS,u}$ is a quantity of spatial streams of the $u^{th}$ user, and $N_{BPSCS,u}$ is a quantity of encoded bits on each subcarrier of each spatial stream of the $u^{th}$ user.

(3) The transmitter determines, according to the following formula, a number (denoted as $u_{max}$ in the following) of a user having a largest quantity of encoded bits among all users:

$$u_{max} = \text{argmax}_{u=0}^{N_{user,total}-1}\left(N_{SD,short,u} - 1 + \frac{a_{init,u}}{4}\right)$$

$$\text{argmax}\, f(c) := \{x \in [0, N_{user,total} - 1]: f(y) \le f(x) \text{ for all } y \in [0, N_{user,total} - 1]\}$$

(4) The transmitter determines a quantity of initial segments and a quantity of initial OFDM symbols of $u_{max}$ as a quantity of common initial segments and a quantity of initial OFDM symbols of all users, that is:

$$a_{init} = a_{init,u_{max}} \quad (4)$$

$$N_{SYM,init} = N_{SYM,init,u_{max}} \quad (5)$$

(5) The transmitter calculates a quantity of initial data bits and a quantity of initially encoded bits of a last OFDM symbol of each user according to the following formula:

$$N_{DBPS,last,init,u} = \begin{cases} a_{init} \cdot N_{DBPS,short,u} & \text{if } a_{init} < 4 \\ N_{DBPS,u} & \text{if } a_{init} = 4 \end{cases}$$

$$N_{CBPS,last,init,u} = \begin{cases} a_{init} \cdot N_{CBPS,short,u} & \text{if } a_{init} < 4 \\ N_{CBPS,u} & \text{if } a_{init} = 4 \end{cases}$$

For each user who uses the LDPC coding, the pre-forward error correction padding bits (pre-FEC padding bits) of the $u^{th}$ user may be calculated according to the following formula:

$$N_{PAD,Pre-FEC,u} = (N_{SYM,init} - 1)N_{DBPS,u} + N_{DBPS,last,init,u} - 8 \cdot \text{APEP\_LENGTH}_u - N_{service}$$

For each user who uses the LDPC coding, a quantity of load bits $N_{pld,u}$ and a quantity of bits $N_{avbits,u}$ that can be transmitted of the $u^{th}$ user are calculated according to the following formula (6) and formula (7) respectively:

$$N_{pld,u} = (N_{SYM,init} - 1)N_{DBPS,u} + N_{DBPS,last,init,u} \quad (6)$$

$$N_{avbits,u} = (N_{SYM,init} - 1)N_{CBPS,u} + N_{CBPS,last,init,u} \quad (7)$$

The transmitter calculates, based on $N_{pld,u}$ and $N_{avbits,u}$, a code length $L_{LDPC,u}$ of an LDPC code word and a quantity of code words $N_{CW,u}$ of $N_{avbits,u}$ according to a table or a formula predetermined in a communication standard.

Then, the transmitter calculates a quantity of shortening bits $N_{shrt,u}$ of the $u^{th}$ user and a quantity of bits $N_{punc,u}$ that are punctured of the $u^{th}$ user.

$$N_{shrt,u} = \max(0, (N_{CW,u} \times L_{LDPC,u} \times R_u) - N_{pld,u})$$

$$N_{punc,u} = \max(0, (N_{CW,u} \times L_{LDPC,u}) - N_{avbits,u} - N_{shrt,u})$$

For a user who uses the LDPC coding, if at least one user meets a condition of the following formula (8), the transmitter sets an LDPC extra symbol segment field in the EHT-SIG field to be 1.

$$(N_{punc,u} > 0.1 \times N_{CW,u} \times L_{LDPC,u} \times (1 - R_u)) \text{ AND } \left(N_{shrt,u} < 1.2 \times N_{punc,u} \times \frac{R_u}{1 - R_u}\right) \text{ is true OR if } N_{punc,u} > 0.3 \times N_{CW,u} \times L_{LDPC,u} \times (1 - R_u) \text{ is true} \quad (8)$$

In this embodiment of this disclosure, the condition in the formula (8) is referred to as an LDPC extra symbol segment condition below.

In addition, $N_{avbits,u}$ is added by using the following formulas (9) and (10) for all users who use the LDPC coding, and $N_{punc,u}$ is recalculated. When at least one user meets the condition of the formula (8), all users who use the LDPC coding update $N_{avbits,u}$ and $N_{punc,u}$.

$$N_{avbits,u} = \begin{cases} N_{avbits,u} + N_{CBPS,u} - 3 \cdot N_{CBPS,short,u}, & \text{if } a_{init=3} \\ N_{avbits,u} + N_{CBPS,short,u}, & \text{otherwise} \end{cases} \quad (9)$$

$$N_{punc,u} = \max(0, (N_{CW,u} \times L_{LDPC,u}) - N_{avbits,u} - N_{shrt,u}) \quad (10)$$

Further, the transmitter updates the pre-FEC padding factor a and $N_{STM}$ according to the following formula:

$$\begin{cases} N_{SYM} = N_{SYM,imit} + 1 \text{ and } a = 1, & \text{if } a_{init} = 4 \\ N_{SYM} = N_{SYM,init} \text{ and } a = a_{init} + 1, & \text{otherwise} \end{cases}$$

It may be understood that, in the foregoing entire formula, if an initial captured position is 4, it indicates that it is already in a largest quantity of segments of the last symbol. If another segment is to be added, a symbol is added first, and then a first captured position is selected from the added symbol, that is, the captured position a=1.

If no user that uses the LDPC coding meets the condition of LDPC extra symbol segment condition, or all users use the BCC coding, the LDPC extra symbol segment field in the EHT-SIG field is set to be 0, $N_{SYM}=N_{SYM,\ init}$, and $a=a_{init}$.

That is, if the LDPC extra symbol segment condition is not met, the pre-FEC padding factor a and $N_{SYM}$ are not updated. Therefore, the pre-FEC padding factor a is the quantity of initial segments, and $N_{SYM}$ is also the quantity of initial symbols.

In addition, for a user who uses the LDPC coding:

$$N_{DBPS,last,u} = N_{DBPS,last,init,u},$$

$$\text{where } N_{DBPS,last,init,u} = \begin{cases} a_{init} \cdot N_{DBPS,short,u} & \text{if } a_{init} < 4 \\ N_{DBPS,u} & \text{if } a_{init} = 4 \end{cases}$$

For a user who uses the BCC coding:

$$N_{CBPS,last,u} = \begin{cases} a \cdot N_{CBPS,short,u} & \text{if } a_{init} < 4 \\ N_{CBPS,u} & \text{if } a_{init} = 4 \end{cases}$$

In addition, for any user, regardless of whether the LDPC coding or the BCC coding is used, $N_{CBPS,last,u}$ of the last symbol is calculated as follows:

$$N_{CBPS,last,u} = \begin{cases} a \cdot N_{CBPS,short,u} & \text{if } a < 4 \\ N_{CBPS,u} & \text{if } a = 4 \end{cases}$$

In addition, for a user who uses the BCC coding, the quantity of pre-FEC padding bits (that is, pre-forward error correction padding bits) is calculated according to the following formula:

$$N_{PAD,Fre-FEC,u} = (N_{SYM} - 1)N_{DBPS,u} + N_{DBPS,last,init,u} - 8 \cdot \text{APEP\_LENGTH}_u - N_{service}$$

For any user, regardless of whether the LDPC coding or the BCC coding is used, the quantity of post-FEC padding bits (that is, post-forward error correction padding bits) of the last symbol is calculated according to the following formula:

$$N_{PAD,Post-FEC,u} = N_{CBPS,u} - N_{CBPS,last,u}$$

Further, pre-FEC padding is classified into MAC padding and PHY padding, and quantities of bits are respectively as follows:

$$N_{PAD,Fre-FEC,MAC,u} = 8 \cdot \left\lfloor \frac{N_{PAD,Pre-FEC,u}}{8} \right\rfloor$$

$$N_{PAD,Fre-FEC,PHY,u} = N_{PAD,Fre-FEC,u} \bmod 8.$$

In addition, the receiver further claims, to the transmitter, a capability that the receiver uses for extra processing time. The capability is referred to as a nominal packet padding capability in this specification. This is not limited herein. Selection of duration of each field of a PPDU sent by a transmitter to a receiver meets a nominal packet padding capability of the receiver, where a condition is that a sum of duration of a post-forward error correction padding part (that is, duration of post-FEC padding bits, refer to FIG. 2) and duration of a PE field is greater than or equal to all nominal packet padding capabilities claimed by the receiver.

2. Coding Procedure of an EHT TB PPDU.

Figure 3:
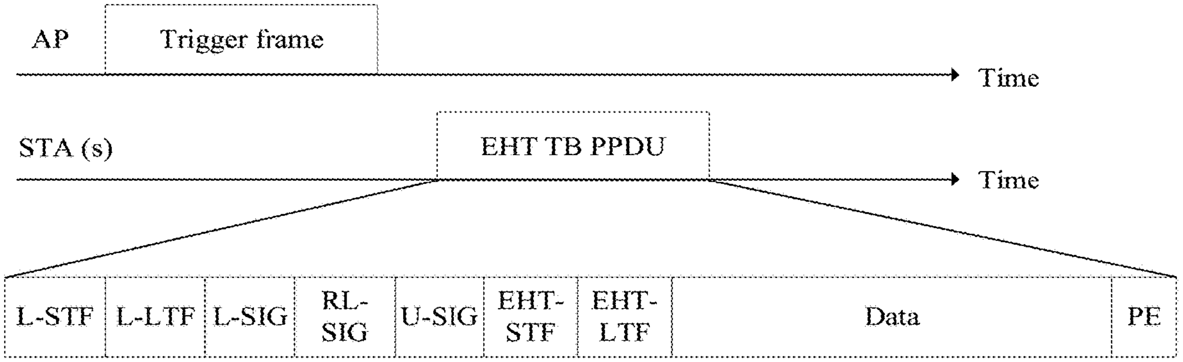
FIG. 3 depicts a coding procedure of an EHT TB PPDU according to this disclosure.

FIG. 3 shows a coding procedure of an EHT TB PPDU according to this disclosure. As shown in FIG. 3, an example in which an AP sends a trigger frame to schedule an EHT TB PPDU is used for description. The AP first sends a trigger frame to schedule one or more STAs to send the EHT TB PPDU. In the trigger frame, the AP indicates an uplink length, a guard interval, a type of an EHT-LTF field, a quantity of symbols in the EHT-LTF field, a pre-FEC padding factor, an LDPC extra symbol segment field, and a packet extension (PE) disambiguity field. It should be noted that the trigger frame is a MAC frame, or is referred to as a MAC protocol data unit (MPDU), and is carried in a data field, or carried in a physical service data unit (PSDU) or a PPDU.

If the transmitter calculates, by using the foregoing coding procedure of the EHT MU PPDU, that at least one user meets the LDPC extra symbol segment condition, the transmitter sets the LDPC extra symbol segment field in the trigger frame to be 1. Different from the coding procedure of the EHT MU PPDU, even if the LDPC extra symbol segment condition is not met, the AP may set the LDPC extra symbol segment field to be 1. However, in the coding procedure of the EHT MU PPDU, if the LDPC extra symbol segment condition is not met, the transmitter sets the LDPC extra symbol segment field to be 0.

After receiving the trigger frame, the STA calculates a length $T_{PE}$ of the PE field and a quantity of OFDM symbols $N_{SYM}$ of a data field based on a parameter and the information that are indicated in the trigger frame.

Further, the STA may separately calculate $T_{PE}$ and $N_{SYM}$ according to a formula (11) and a formula (12).

$$T_{PE} = \left\lfloor \frac{\left(\frac{\text{LENGTH} + 2 + 3}{3} \times 4 - T_{EHT-Preamble}\right) - N_{SYM}T_{SYM}}{4} \right\rfloor \times 4 \quad (11)$$

$$N_{SYM} = \left\lfloor \frac{\left(\frac{\text{LENGTH} + 2 + 3}{3} \times 4 - T_{EHT-Preamble}\right)}{T_{SYM}} \right\rfloor - b_{PE-Disambiguity} \quad (12)$$

In the formula (12), $b_{PE-Disambiguity}$ represents a bit value included in the PE disambiguity field, and is indicated by the trigger frame. When the length of the PE field is 16 microseconds or 20 microseconds, the length of the PE field may be ambiguous. For example, there may be an OFDM symbol in the last 16 microseconds, and the length of the PE field is 0, or there may be a PE field whose length is 16 microseconds. The PE disambiguity field indicates to distinguish between the two cases, to eliminate ambiguity.

The trigger frame includes a coding indication field for each STA, to indicate the STA to use the BCC or the LDPC. However, when a quantity of subcarriers of an RU or an MRU allocated to a specific STA is greater than or equal to 242, the STA fixedly uses the LDPC, and is not indicated.

For a STA, if the BCC coding is used, a coding procedure is similar to the coding procedure of the EHT MU PPDU, where $N_{SYM,init}=N_{SYM}$, $a_{init}=a$, and a is a pre-FEC padding factor, and is indicated by a trigger frame.

If the LDPC coding is used, in one case, the LDPC extra symbol segment field is set to be 1, and the STA calculates $a_{init}$ a based on a that is indicated in the trigger frame.

Further, the STA performs calculation according to the following formula:

$$\begin{cases} a_{init} = 4 \text{ and } N_{SYM,init} = N_{SYM} - 1, & \text{if } a = 1 \\ a_{init} = a - 1 \text{ and } N_{SYM,init} = N_{SYM} & \text{otherwise} \end{cases}$$

After obtaining $a_{init}$ and $N_{SYM,init}$ through calculation, the STA updates $N_{avbits,u}$ and $N_{punc,u}$ according to the foregoing formula (9) and formula (10), and then performs coding by using a subsequent coding procedure of the EHT MU PPDU.

If the LDPC coding is used, in another case, the LDPC extra symbol segment field is set to be 0, and $N_{SYM,\ init}=N_{SYM}$, and $a_{init}=a$. In other words, in this case, $N_{avbits,u}$ and $N_{punc,u}$ are not updated, and the STA may directly perform coding by using a subsequent coding procedure of the EHT MU PPDU.

The foregoing describes the coding procedures of the EHT MU PPDU and the EHT TB PPDU in this disclosure. The selection of the pre-FEC padding factor, determining of the LDPC extra symbol segment condition, and setting of the LDPC extra symbol segment field are involved.

The technical solutions provided in this disclosure are applicable to a WLAN scenario, for example, are applicable to standards of an IEEE 802.11 system, for example, 802.11a/b/g, 802.11n, 802.1 lac, 802.1 lax, or a next generation of 802.1 lax, for example, 802.11be or a further next generation standard.

Although embodiments of this disclosure are mainly described by using an example in which a WLAN network is deployed, especially a network to which an IEEE 802.11 system standard is applied, a person skilled in the art easily understands that aspects involved in this disclosure may be extended to another network that adopts various standards or protocols, for example, a high-performance radio local area network (HIPERLAN), a wide area network (WAN), a personal area network (PAN), or another network that is known or developed in the future. The HIPERLAN is a wireless standard similar to the Institute of Electrical and Electronics Engineers (IEEE) 802.11 and is mainly used in Europe. Therefore, the various aspects provided in this disclosure are applicable to any suitable wireless network regardless of coverage and wireless access protocols.

Embodiments of this disclosure may be further applicable to a WLAN system such as an Internet of things (IoT) network or a vehicle to X (V2X) network. Certainly, embodiments of this disclosure may be further applicable to another possible communication system, for example, a Long-Term Evolution (LTE) system, an LTE frequency division duplex (FDD) system, an LTE time division duplex (TDD) system, a universal mobile tele communication system (UMTS), a Worldwide Interoperability for Microwave Access (WIMAX) communication system, a 5th generation (5G) communication system, and a future 6th generation (6G) communication system.

The foregoing communication systems used in this disclosure are merely examples for description, and are not limited thereto. Unified descriptions are provided herein and details are not described below again.

Figure 4:
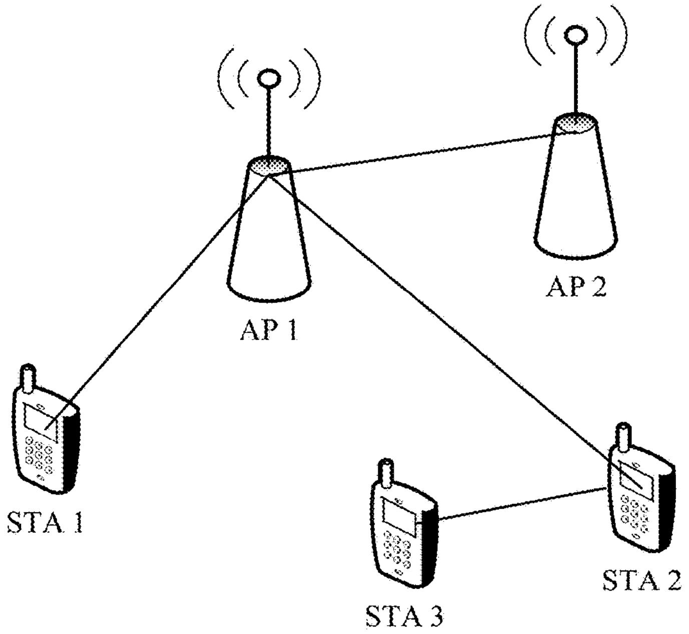
FIG. 4 is a schematic diagram of a communication system according to this disclosure.

FIG. 4 is a schematic diagram of a communication system according to this disclosure. As shown in FIG. 4, the method for sending a PPDU provided in this disclosure is applicable to data communication between one or more APs and one or more STAs (for example, data communication between an AP 1 and a STA 1 and a STA 2), data communication between APs (for example, data communication between an AP 1 and an AP 2), and data communication between STAs (for example, data communication between a STA 2 and a STA 3).

The access point may be an access point for a terminal device (for example, a mobile phone) to access a wired (or wireless) network, and is mainly deployed at home, or inside a building or a zone, with a typical coverage radius of dozens of meters to hundreds of meters. Certainly, the access point may also be deployed outdoors. The access point is equivalent to a bridge that connects a wired network and a wireless network. A main function of the access point is to connect various wireless network clients together and then connect the wireless network to the Ethernet. Further, the access point may be a terminal device (for example, a mobile phone) or a network device (for example, a router) that has a WI-FI chip. The access point may be a device that supports the 802.11be standard. The access point may also be a device that supports a plurality of WLAN standards of an 802.11 family, such as 802.11ax, 802.11ac, 802.11n, 802.11g, 802.11b, 802.11a, and a next generation of 802.11be. The access point in this disclosure may be a high-efficiency (HE) AP or an EHT AP, or may be an access point applicable to a future generation of WI-FI standards.

The station may be a wireless communication chip, a wireless sensor, a wireless communication terminal, or the like, and may also be referred to as a user. For example, the station may be a mobile phone, a tablet computer, a set-top box, a smart television set, a smart wearable device, a vehicle-mounted communication device, a computer, or the like that supports a WI-FI communication function. Optionally, the station may support the 802.11be standard. The station may also support a plurality of WLAN standards of an 802.11 family, such as 802.11 ax, 802.11 ac, 802.11n, 802.11g, 802.11b, 802.11a and a next generation of 802.11be.

The STA in this disclosure may be a high-efficiency (HE) STA or an EHT STA, or may be a STA applicable to a future generation of WI-FI standards.

For example, the access point and the station may be devices used in the vehicle to X, nodes, sensors, or the like used in the IoT, smart cameras, smart remote controls, smart water or electricity meters, or the like in a smart home, sensors in a smart city, and the like.

An embodiment of this disclosure provides a communication method applied to a WLAN system. The method may be implemented by a communication device in the WLAN system or a chip or a processor in a communication device. The communication device may be a wireless communication device that supports multi-link parallel transmission, for example, referred to as a multi-link device or a multi-band device. Compared with a device that supports only single-link transmission, the multi-link device has higher transmission efficiency and a higher throughput.

Figure 21:
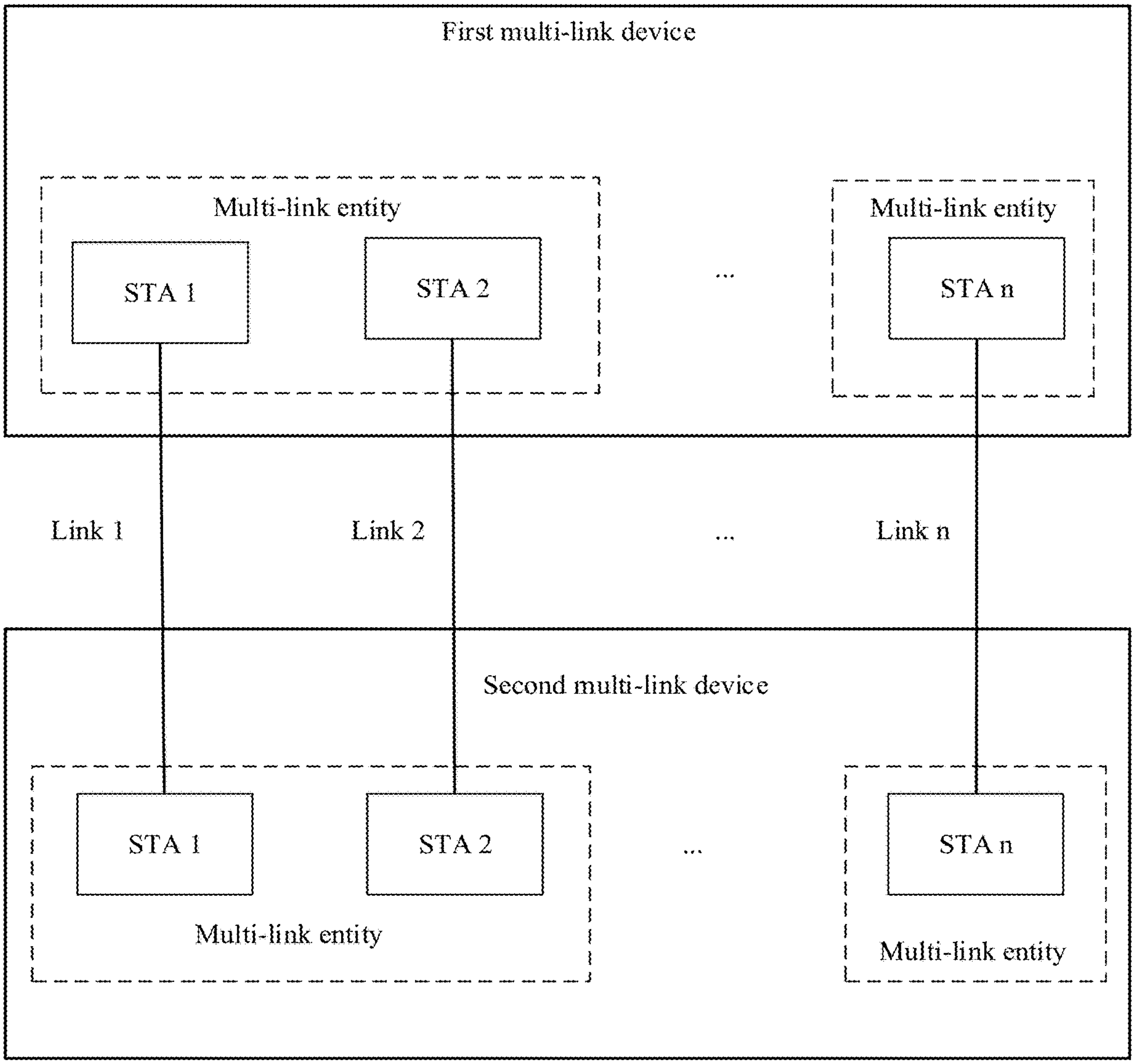
FIG. 21 is a schematic diagram of communication between multi-link devices according to this disclosure.

FIG. 21 is a schematic diagram of communication between multi-link devices according to this disclosure.

As shown in FIG. 21, the multi-link device includes one or more affiliated STAs, and the affiliated STAs are logical stations and may work on one link. The affiliated station may be an access point (AP) or a non-access point (non-AP) STA. For ease of description, in this disclosure, a multi-link device whose affiliated station is an AP may be referred to as a multi-link AP, a multi-link AP device, or an AP multi-link device. A multi-link device whose affiliated station is a non-AP STA may be referred to as a multi-link STA, a multi-link STA device, or a STA multi-link device. For ease of description, that "a multi-link device includes an affiliated STA" is also briefly described as that "a multi-link device includes a STA" in embodiments of this disclosure.

It should be noted that a multi-link device includes a plurality of logical stations, and each of the logical stations works on a single link, but a plurality of logical stations are allowed to work on a same link. A link identifier mentioned below represents one station operating on one link. In other words, if there is more than one station on one link, more than one link identifier is used to represent the more than one station. A link mentioned below sometimes also represents a station operating on the link.

A transmitter mentioned below in this disclosure may be a multi-link device (for example, a first multi-link device in FIG. 21), and a receiver may alternatively be a multi-link device (for example, a second multi-link device in FIG. 21). In addition, either of the transmitter and the receiver may be the multi-link device. This is not limited.

The following also separately describes solutions for implementing EHT PPDU alignment for EHT PPDUs in two different formats: an EHT MU PPDU and an EHT TB PPDU.

1. EHT Mu PPDU Alignment.

Figure 5:
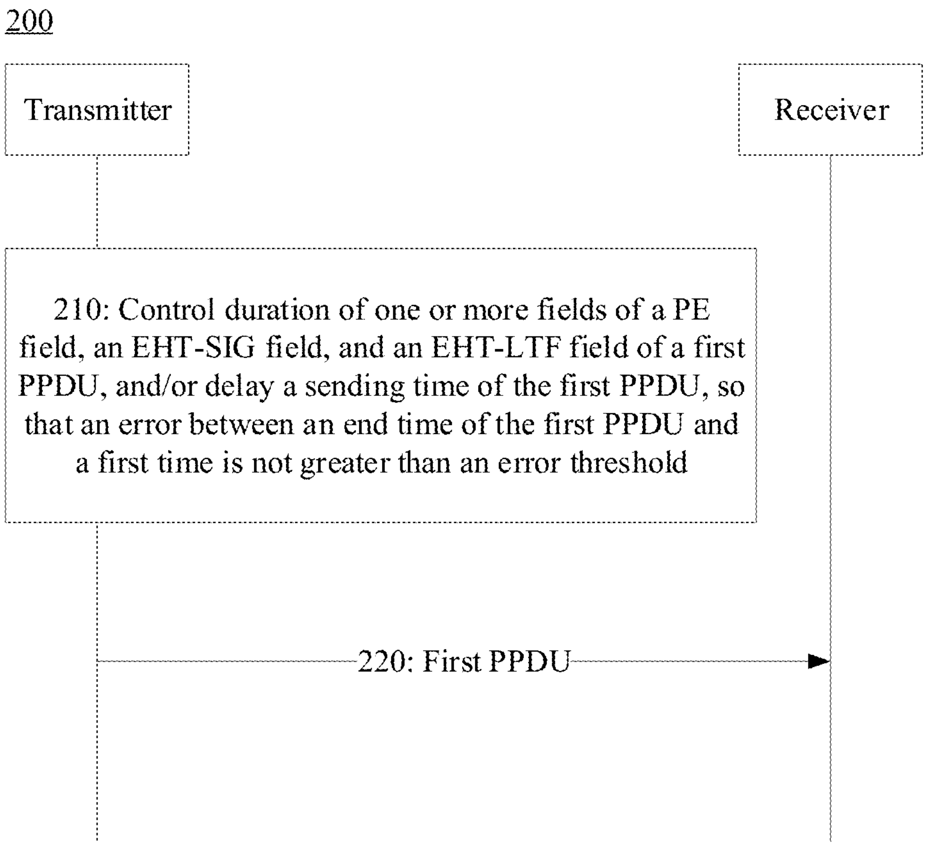
FIG. 5 is a schematic flowchart of a method for sending a PPDU according to this disclosure.

FIG. 5 is a schematic flowchart of a method 200 for sending a PPDU according to this disclosure and includes the following steps.

Step 210: A transmitter controls duration of one or more fields of a PE field, an EHT-SIG field, and an EHT-LTF field of a first PPDU, and/or delays a sending time of the first PPDU, so that an error between an end time of the first PPDU and a first time is not greater than an error threshold.

Step 220: The transmitter sends the first PPDU.

A receiver receives the first PPDU.

In the technical solution provided in this disclosure, the transmitter implements alignment between the end time of the first PPDU and the first time by controlling the duration of one or more fields of the PE field, the EHT-SIG field, and the EHT-LTF field of the first PPDU, and/or delays the sending time of the first PPDU.

Optionally, the first time may be an end time of a PPDU (for example, a second PPDU) on another link different from the link on which the first PPDU is located, or may be a specific time determined by the transmitter. This is not limited.

It should be specially noted that "alignment" in this disclosure does not mean strictly complete alignment, and the alignment is implemented, provided that a time interval between the end time of the first PPDU and the first time is less than the error threshold. Therefore, the end time of the first PPDU may be before or after the first time, or overlap with the first time. For example, the error threshold may be set according to a requirement in an alignment scenario. For example, the error threshold is 8 microseconds, 4 microseconds, or the like.

The following describes several different implementations of PPDU alignment by using different fields in this disclosure.

(1) PE Field.

Solution 1:

In the solution 1, the first PPDU includes a preamble, a data field, and the PE field, duration of the PE field is determined based on first duration, duration of the preamble, and duration of a symbol in the data field, and the first duration is duration between the first time and a start time of the first PPDU.

The duration of the symbol in the data field is a length of one symbol in the data field.

It should be noted that the "symbol" in this disclosure is an OFDM symbol. Lengths of symbols in different fields of the first PPDU may be different. For example, the length of the symbol in the data field may be different from duration of a symbol in another field included in the preamble. Therefore, the symbol in the data field and the symbol in the EHT-LTF field further refer to respective symbols in these fields.

Figure 6:
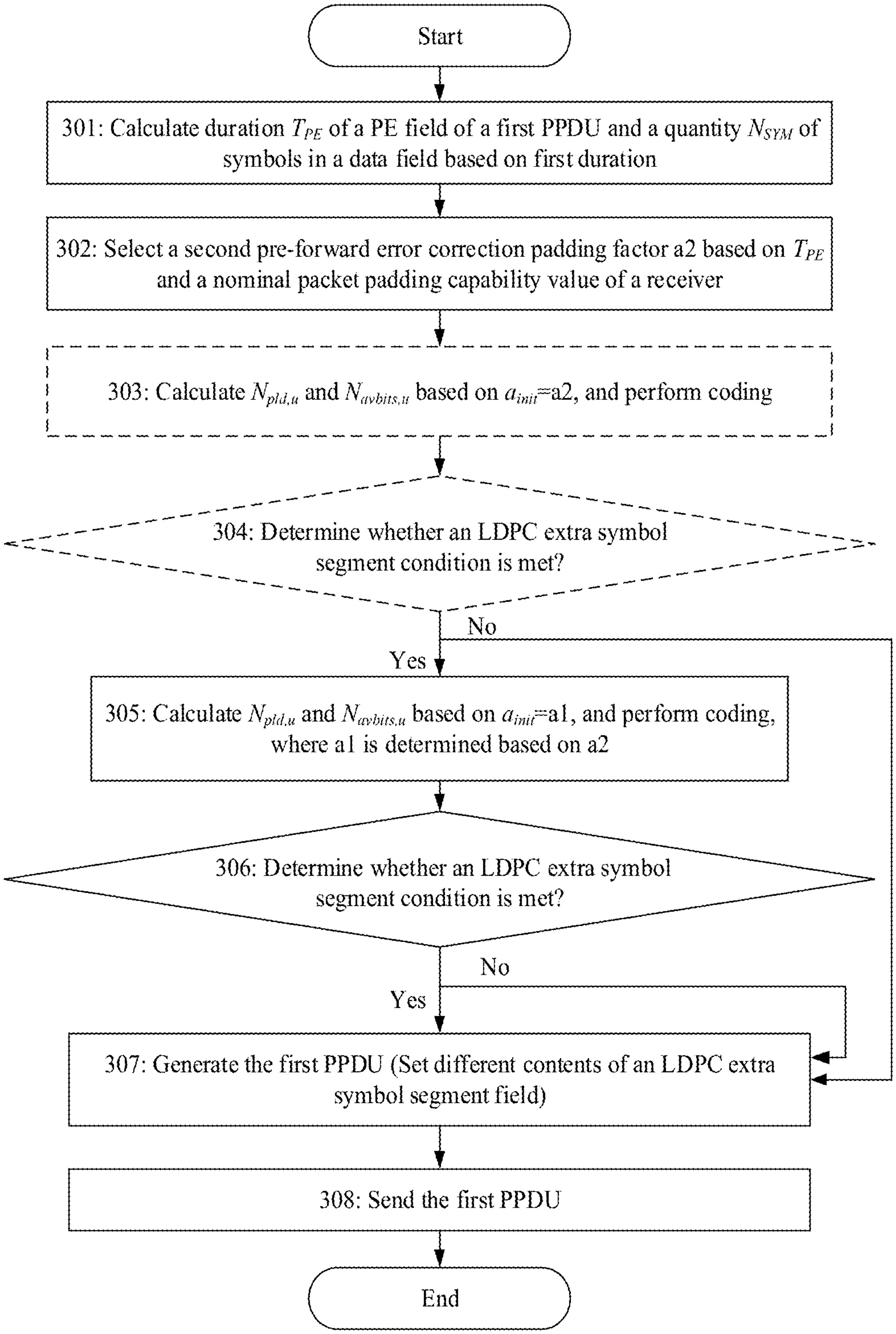
FIG. 6 is a flowchart of generating and sending a first PPDU by a transmitter according to this disclosure.

With reference to FIG. 6, the following describes in detail how the transmitter implements alignment between the end time of the first PPDU and the first time by controlling the duration of the PE field.

FIG. 6 is a flowchart of generating and sending a first PPDU by a transmitter according to this disclosure.

Step 301: The transmitter calculates a quantity (denoted as $N_{SYM}$ below) of symbols in the data field of the first PPDU and the duration (denoted as $T_{PE}$ below) of the PE field based on the first duration.

The first duration is expected duration (or target duration) in which the transmitter sends the first PPDU.

For example, the transmitter calculates, by using an end time of a PPDU on another link as a reference point, available duration for sending the first PPDU on a current link. For another example, the transmitter expects that the first PPDU ends at a specific time (for example, the first time), and calculates, by using the time as a reference point, available duration for sending the first PPDU, that is, the first duration. It should be understood that for the "available duration for sending the first PPDU", the duration for sending the first PPDU is limited by the first time to implement alignment between the end time of the first PPDU and the first time. In other words, the first time is used as a reference point, and the transmitter sends the first PPDU by using remaining duration from the start time of the first PPDU to the first time, to implement alignment between the end time of the first PPDU and the first time.

Figure 7:
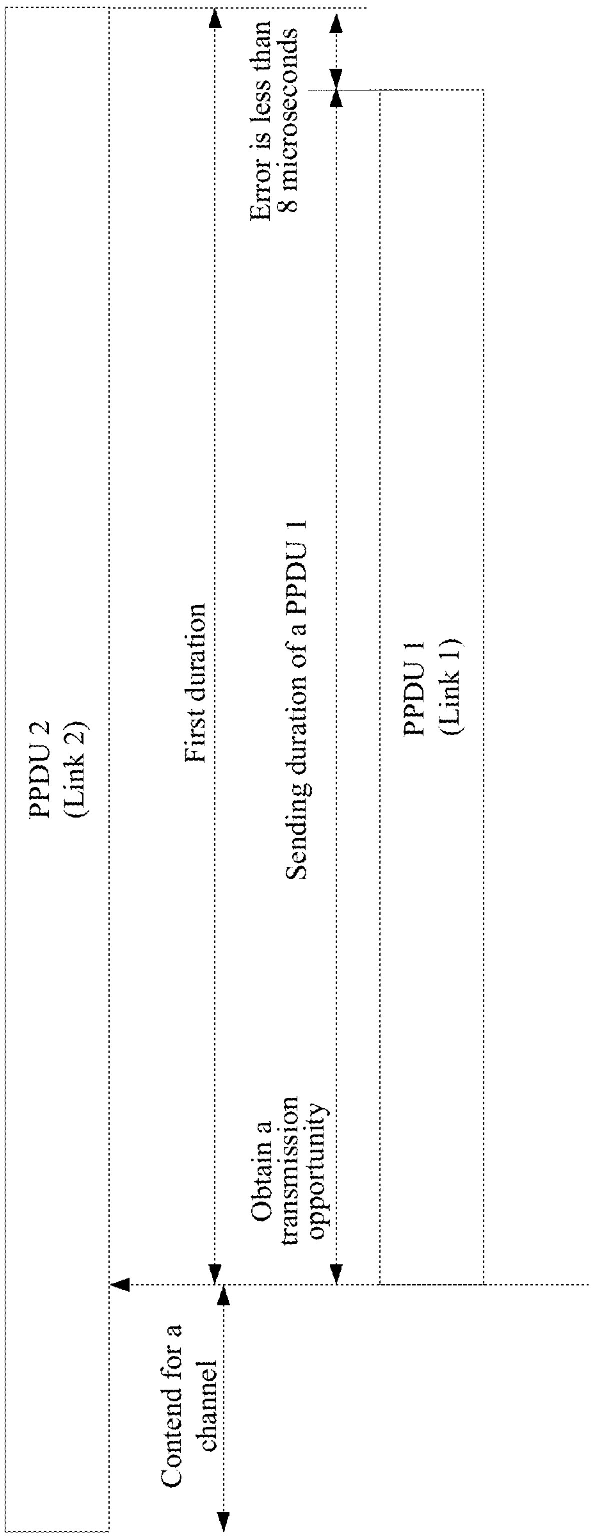
FIG. 7 is an example of determining first duration according to this disclosure.

FIG. 7 shows an example of determining first duration according to this disclosure. As shown in FIG. 7, a transmitter sends a PPDU 2 on a link 2. The transmitter obtains an opportunity of transmission on a link 1 by contending for a channel. It is assumed that the transmitter sends a PPDU 1 on the link 1. It is assumed that an error threshold between an end time of the PPDU 1 and an end time of the PPDU 2 is 8 microseconds. The transmitter calculates duration between a start time of the PPDU 1 and the end time of the PPDU 2, and the duration is the first duration in this disclosure.

The transmitter calculates a quantity $N_{SYM}$ of symbols in the data field according to the following formula (13):

$$N_{SYM} = -\left\lfloor \frac{TXTIME_{target} - T_{preamble} - T_{SE}}{T_{SYM}} \right\rfloor, \tag{13}$$

where $TXTIME_{target}$ represents the first duration. $T_{preamble}$ is a duration of a preamble, and $T_{SE}$ is signal extension duration, where the value is 6 microseconds when sending is performed in a 2.4 gigahertz (GHz) frequency band, or the value of is 0 microseconds when sending is performed in a 5 GHz or 6 GHz frequency band. $T_{SM}$ represents duration of one OFDM symbol in the data field of the first PPDU.

After obtaining $N_{SYM}$ through calculation, the transmitter calculates remaining duration according to formula (14):

$$T_{PE\_est} = \mathrm{mod}(TXTIME_{target} - T_{preamble} - T_{SE}, T_{SYM}), \tag{14}$$

where $T_{PE\_est}$ represents the remaining duration, $T_{preamble}$ is the duration of the preamble, $T_{SE}$ is the signal extension duration, and $T_{SYM}$ is the duration of one OFDM symbol in the data field of the first PPDU.

The transmitter sets the duration of the PE field to the remaining duration, so that alignment of the first PPDU can be implemented.

For example, the duration of the PE field may be determined according to the following formula (15):

$$T_{PE} = 4 \times \left\lfloor \frac{T_{PE\_est}}{4} \right\rfloor \text{ or } 4 \times \left\lceil \frac{T_{PE\_est}}{4} \right\rceil \tag{15}$$

It should be understood that the formula (15) is designed in this way because the duration of the PE field is a multiple of 4 microseconds.

In addition, the PE disambiguity field is set to be 0 based on $T_{PE}$ obtained according to the foregoing formula.

Optionally, if $T_{PE}$ is equal to 0 or 4 microseconds, the transmitter may further choose to reduce one OFDM symbol, to obtain larger $T_{PE}$, so that the receiver obtains more processing duration. To be specific, based on the $N_{SYM}$ calculated according to the formula (13), the transmitter sets $N_{SYM}=N_{SYM}-1$, and in this case, the transmitter sets the PE disambiguity field to be 1, so that the receiver can eliminate ambiguity of a length of the PE field.

$$T_{PE} = 4\times\left\lfloor\frac{T_{PE\_est}+T_{SYM}}{4}\right\rfloor \text{ or } 4\times\left\lceil\frac{T_{PE\_est}+T_{SYM}}{4}\right\rceil$$

In this case, the first duration may be determined according to the following formula:

$$TXTIME = T_{preamble} + N_{SYM}\times T_{SYM} + T_{PE} + T_{SE}.$$

In addition, the transmitter further selects a coding scheme, a modulation and coding scheme, a spatial stream, and the like of each user (that is, the receiver). For details, refer to the foregoing described coding procedure of the EHT MU PPDU. Details are not described herein again.

Step 302: The transmitter selects a second pre-forward error correction padding factor based on $T_{PE}$ and a nominal packet padding capability value of the receiver.

For clarity and brevity of description, the second pre-forward error correction padding factor is denoted as a2 below.

The nominal packet padding capability value of the receiver is used to indicate a nominal packet padding capability of the receiver, and the nominal packet padding capability value may be provided by the receiver to the transmitter.

Step 303: The transmitter calculates $N_{pld,u}$ and $N_{avbits,u}$ based on $a_{init}$=a2, and performs coding.

It should be understood that, $a_{init}$ is the quantity of initial segments mentioned above, and $a_{init}$=a2 indicates that the transmitter uses a2 as the quantity of initial segments. It can be learned from the coding procedure of the EHT MU PPDU described above that after determining the quantity of initial segments (that is, $a_{init}$) and the quantity of initial symbols in the data field (that is, $N_{SYM,init}$), the receiver may obtain $N_{pld,u}$ and $N_{avbits,u}$ of the receiver through calculation, and perform coding based on $N_{pld,u}$ and $N_{avbits,u}$.

Step 304: The transmitter determines whether an LDPC extra symbol segment condition is met.

Further, after obtaining $N_{pld,u}$ and $N_{avbits,u}$ through calculation, the transmitter performs EHT MU PPDU coding. Through coding, the transmitter may learn of a quantity of shortening bits $N_{shrt,u}$ and a quantity of punctured bits $N_{punc,u}$. Further, based on $N_{shrt,u}$ and $N_{punc,u}$, the transmitter determines whether the LDPC extra symbol segment condition is met.

For descriptions of the LDPC extra symbol segment condition, refer to the foregoing descriptions. Details are not described herein again.

If the LDPC extra symbol segment condition is not met, the transmitter performs step 307.

If the LDPC extra symbol segment condition is met, the transmitter performs step 305.

It should be noted that step 303 and step 304 are optional steps, as shown in a dashed box in FIG. 6. In other words, in step 302, after selecting a2, the transmitter may directly perform step 305.

Step 305: The transmitter calculates $N_{pld,u}$ and $N_{avbits,u}$ based on $a_{init}$=a1, and performs coding.

In the foregoing, a1 is referred to as a first pre-forward error correction padding factor in this specification, and a1 is determined according to a2.

Further, the transmitter determines a1 according to the following formula (16), and sets $a_{init}$ to a1.

$$\begin{cases} a1 = 4 \text{ and } N_{SYM,init} = N_{SYM}-1, & \text{if } a2 = 1 \\ a1 = a2-1 \text{ and } N_{SYM,init} = N_{SYM} & \text{otherwise} \end{cases} \tag{16}$$

Further, the transmitter calculates $N_{pld,u}$ and $N_{avbits,u}$ based on $a_{init}$=a1 and $N_{SYM,\ init}$, and performs EHT MU PPDU coding by using $N_{pld,u}$ and $N_{avbits,u}$. After coding, $N_{shrt,u}$ and $N_{punc,u}$ are obtained. Therefore, it may be determined, based on $N_{shrt,u}$ and $N_{punc,u}$, whether the LDPC extra symbol segment condition is met.

It should be understood that another case other than a2=1 in the formula (16) further refers to a2=2, a2=3, or a2=4.

It should be noted that, if the transmitter performs step 303 and step 304 after step 302, and performs step 305 based on a determining result in step 304, in step 305, the transmitter sets $a_{init}$ to a1, that is, the transmitter updates $a_{init}$ from a2 to a1. In addition, $N_{SYM,\ init}$ also are re-determined according to formula (16). Then, the transmitter updates $N_{pld,u}$ and $N_{avbits,u}$ based on $a_{init}$=a1 and the re-determined $N_{SYM\ init}$. Further, $N_{shrt,u}$ and $N_{punc,u}$ are updated based on the updated $N_{pld,u}$ and $N_{avbits,u}$, and it is determined, based on the updated $N_{shrt,u}$ and $N_{punc,u}$, whether the LDPC extra symbol segment condition is met.

Step 306: The transmitter determines whether the LDPC extra symbol segment condition is met.

It should be specially noted that, the LDPC extra symbol segment condition is related to $a_{init}$. After $a_{init}$ is updated, it should be considered that a setting parameter of the LDPC extra symbol segment condition changes, and further, changes from a2 to a1.

In other words, although it is determined whether the LDPC extra symbol segment condition is met in both step 304 and step 306, the LDPC extra symbol segment condition in step 304 is set based on $a_{init}$=a2, that is, is set based on a2. However, in step 306, $a_{init}$ is updated to a1. Therefore, the LDPC extra symbol segment condition in step 306 is set based on $a_{init}$=a1, that is, is set based on a1.

In addition, it can be learned from the formula (16) that, in addition to $a_{init}$, the LDPC extra symbol segment condition is also related to $N_{SYM\ init}$. However, an update of $a_{init}$ does not necessarily cause an update of $N_{SYM,\ init}$. It should be understood that $N_{SYM}$ in the formula (16) is the quantity of symbols that are in the data field of the first PPDU and that are obtained through calculation based on the first time, and is obtained through calculation according to the formula (13). In addition, $N_{SYM,\ init}$ is a quantity of symbols in the data field that is set in the LDPC extra symbol segment condition.

Step 307: The transmitter generates the first PPDU.

Further, the transmitter sets an LDPC extra symbol segment field of the first PPDU based on a determining result of whether the LDPC extra symbol segment condition is met.

As described in the foregoing step 304, if the transmitter determines that the LDPC extra symbol segment condition is not met, the transmitter directly performs step 307. In this case, the transmitter sets the LDPC extra symbol segment field to a second value, the second value indicates that no LDPC extra symbol segment is to be added, and the LDPC extra symbol segment field carries a2.

If the transmitter sets the LDPC extra symbol segment field based on the determining result in step 306, the transmitter sets the LDPC extra symbol segment field according to the following principles.

If the LDPC extra symbol segment condition is met, the transmitter sets the LDPC extra symbol segment field to a first value, and the LDPC extra symbol segment field carries a2. For example, the first value may be "1".

If the LDPC extra symbol segment condition is not met, the transmitter sets the LDPC extra symbol segment field to a second value, and the LDPC extra symbol segment field carries a1. For example, the second value may be "0".

After the transmitter determines the duration of the PE field and sets the LDPC extra symbol segment field, it is equivalent to that the transmitter determines fields of the first PPDU. Based on this, the transmitter generates the first PPDU.

Step 308: The transmitter sends the first PPDU.

It should be understood that the procedure in FIG. 7 is merely intended to facilitate understanding of the solution of this disclosure, and a process in which the transmitter generates the first PPDU is divided into different steps. Actually, in this disclosure, the process in which the transmitter generates the first PPDU is a process in which the transmitter determines duration of each field and sets fields of each field. Therefore, these steps may also be combined into fewer steps, or may be divided into more steps, which should not constitute any limitation on the solution itself. Other procedures in this disclosure are the same, and details are not described below again.

It can be learned that, in the solution 1, the transmitter calculates the duration of the PE field of the first PPDU based on the limitation of the first time, so that alignment between the end time of the first PPDU and the first time can be ensured if the nominal packet padding capability of the receiver is met.

Figure 8:
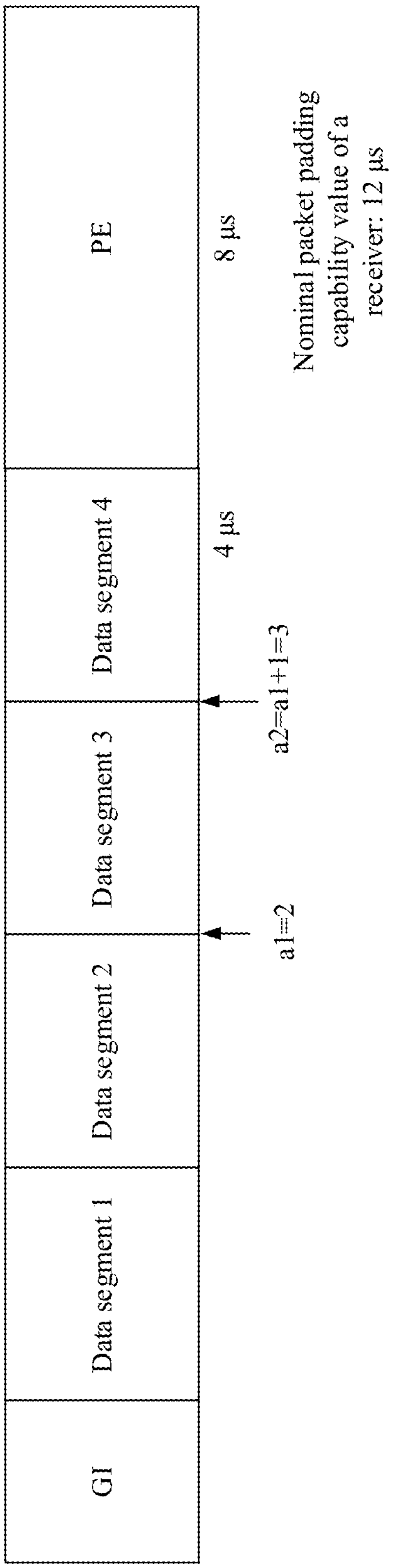
FIG. 8 is a schematic diagram of selecting a pre-forward error correction padding factor by a transmitter according to this disclosure.

The following provides an example of the solution 1 with reference to FIG. 8.

FIG. 8 is a schematic diagram of selecting a pre-forward error correction padding factor by a transmitter according to this disclosure.

As shown in FIG. 8, it is assumed that the nominal packet padding capability value claimed by the receiver is 20 microseconds, and the transmitter selects the duration of the PE field as 8 microseconds. Further, based on step 301 and step 302 shown in FIG. 7, the transmitter selects a2=3. Because duration of a segment is 4 microseconds, and bits in a data segment 4 and the PE field are not processed by the receiver, 12 microseconds used by the nominal packet padding capability of the receiver can be met. In another implementation, the transmitter may alternatively determine a1 based on a2, where a1=3−1=2. That is, the transmitter adds a data segment 3. In this case, the data segment 3 and the data segment 4 are not processed by the receiver. Total duration of the data segment 3, the data segment 4, and the PE field is 4+4+8=16 microseconds. It can be learned that, compared with 12 microseconds used by the receiver, there is extra 4 microseconds, and the receiver obtains more processing time.

In the procedure in FIG. 6, after the transmitter selects a2, in an implementation, the transmitter determines, based on $a_{init}$=a2, whether the LDPC extra symbol segment condition is met. If the LDPC extra symbol segment condition is met, the transmitter continues to determine, based on $a_{init}$=a1, whether the LDPC extra symbol segment condition is met, and then sets the LDPC extra symbol segment field based on a determining result. It can be learned that in this implementation, the transmitter determines whether the LDPC extra symbol segment condition is met twice. The process of selecting the pre-forward error correction padding factor by the transmitter is complex, and a calculation amount is excessively large.

In another implementation, after selecting a2, the transmitter directly selects a1 based on a2, determines, based on $a_{init}$=a1, that the LDPC extra symbol segment condition is met, and then sets the LDPC extra symbol segment field based on a determining result. Compared with a previous implementation, in the latter implementation, a process of determining, based on $a_{init}$=a2, whether the LDPC extra symbol segment condition is met is omitted. In other words, one time of determining the LDPC extra symbol segment condition is reduced, so that a calculation process of the transmitter is simplified. However, after selecting a1, the transmitter still calculates whether the LDPC extra symbol segment condition is met, and a calculation amount is still relatively large.

In view of this, a solution 2 is provided below. Compared with any implementation in the solution 1, in the solution 2, complexity of selecting a pre-forward error correction padding factor is simplified, and a calculation amount in a selection process is also reduced.

Figure 9:
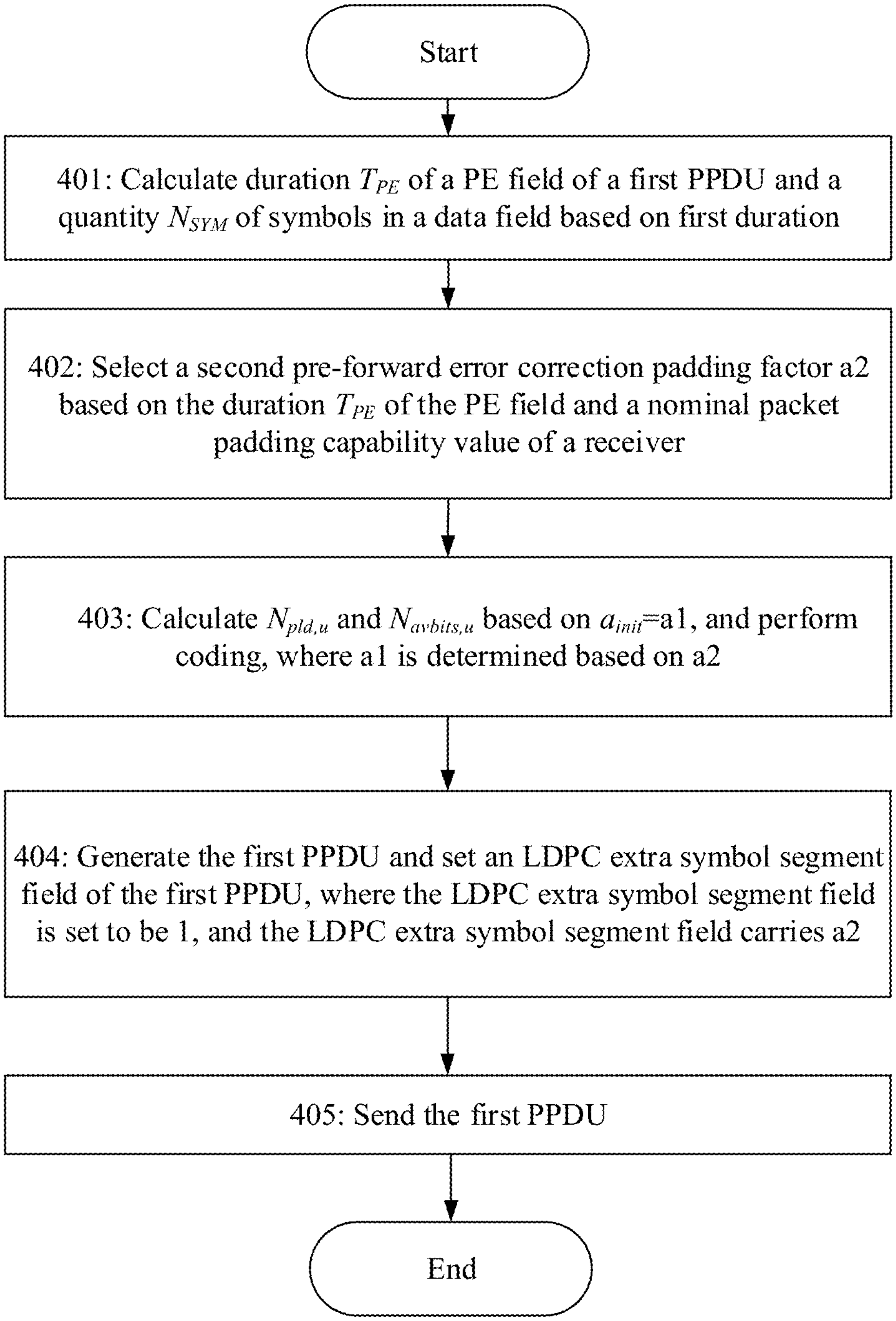
FIG. 9 is another flowchart of generating and sending a first PPDU by a transmitter according to this disclosure.

Solution 2:

FIG. 9 is another flowchart of generating and sending a first PPDU by a transmitter according to this disclosure and includes the following steps.

Step 401: The transmitter calculates $N_{SYM}$ and $T_{PE}$ based on the first duration.

Step 402: Select a2 based on $T_{PE}$ and the nominal packet padding capability value of the receiver.

Step 403: The transmitter calculates $N_{pld,u}$ and $N_{avbits,u}$ based on $a_{init}$=a1, and performs coding. In the foregoing, a1 is determined according to a2.

For example, the transmitter determines a1 according to the following formula and a2.

In the formula, a1 is determined according to a2 and the following formula:

$$\begin{cases} a1 = 4,\ N_{SYM,init} = N_{SYM} - 1, & \text{if } a2 = 1 \\ a1 = a2 - 1 \text{ and } N_{SYM,init} = N_{SYM}, & a2 = 2, 3, 4 \end{cases}$$

It can be seen that the formula is the foregoing formula (16). Details are not described again.

Step 404: The transmitter generates the first PPDU.

In step 404, that the transmitter generates the first PPDU mainly includes that the transmitter sets the LDPC extra symbol segment field of the first PPDU. Further, the transmitter directly sets the LDPC extra symbol segment field to be 1, and the LDPC extra symbol segment field carries a2.

Step 405: The transmitter sends the first PPDU.

In the solution 2, after selecting a2, the transmitter considers by default that the LDPC extra symbol segment condition is met, directly calculates a1 based on a2, and performs coding based on $a_{init}$=a1. After the coding is completed, the LDPC extra symbol segment field is directly set to be 1. In other words, an LDPC extra symbol segment is added by default, and a2 is carried in the LDPC extra symbol segment field.

It can be learned that, in the solution 2, the transmitter does not calculate whether the LDPC extra symbol segment condition is met, so that the process of selecting the pre-forward error correction padding factor is greatly simplified, and the calculation complexity and the calculation amount are reduced.

Figure 10:
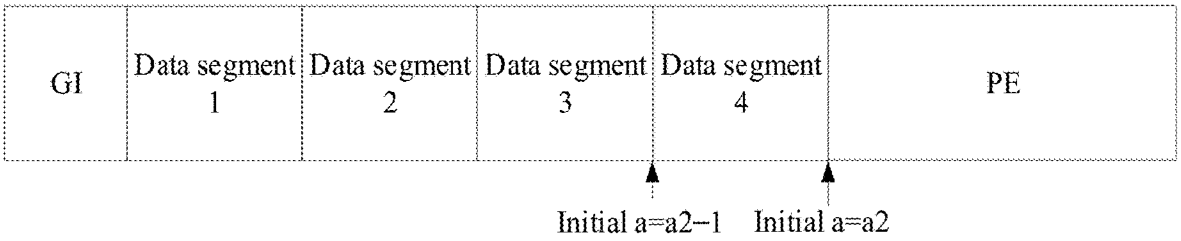
FIG. 10 is another schematic diagram of selecting a pre-forward error correction padding factor by a transmitter according to this disclosure.

The following provides an example of the solution 2 with reference to FIG. 10.

FIG. 10 is another schematic diagram of selecting a pre-forward error correction padding factor by a transmitter according to this disclosure.

As shown in FIG. 10, the transmitter selects a2=4 based on step 401 and step 402 in FIG. 9. Based on this, the transmitter directly determines a1 based on a2, where a1=a2−1=3, that is, directly adds a data segment 3. In this case, the data segment 3 and the data segment 4 are not processed by the receiver. Total duration of the data segment 3, the data segment 4, and the PE field may meet the nominal packet padding capability of the receiver, or enable the receiver to obtain more processing time.

The foregoing describes the solution in which PPDU alignment is implemented by controlling the duration of the PE field.

It can be learned that, in the solution in which PPDU alignment is implemented by using the duration of the PE field, because there is a strict alignment requirement, the transmitter cannot randomly select a length of a to-be-sent MAC frame and a length of the PE field. The transmitter adjusts the length (a granularity of 4 microseconds) of the PE field based on the target time (that is, the first time), to implement alignment of the end time of the PPDU. In this disclosure, it is considered that a length of an OFDM symbol in a data field of an EHT PPDU is one of 13.6 microseconds, 14.4 microseconds, or 16 microseconds, and a granularity is relatively large. Consequently, a PPDU alignment requirement cannot be met by using the symbol in the data field. However, a length granularity of the PE field is a multiple of 4 microseconds, and a PPDU alignment requirement with an error threshold of 4 microseconds or 8 microseconds can be met.

The following describes a solution in which PPDU alignment is implemented by controlling the duration of the EHT-SIG field.

(2) EHT-SIG field.

Solution 3:

In the solution 3, the first PPDU includes a preamble, a data field, and the PE field, the preamble includes the EHT-SIG field, and the EHT-SIG field includes an initial part and a padding part. Duration of the padding part in the EHT-SIG field is determined based on first duration, initial duration of the preamble, duration of the PE field, and duration of a symbol in the data field, the initial duration of the preamble does not include the duration of the padding part in the EHT-SIG field, and the first duration is duration between the first time and a start time of the first PPDU. The duration of the padding part is a multiple of 4 microseconds.

Figure 11:
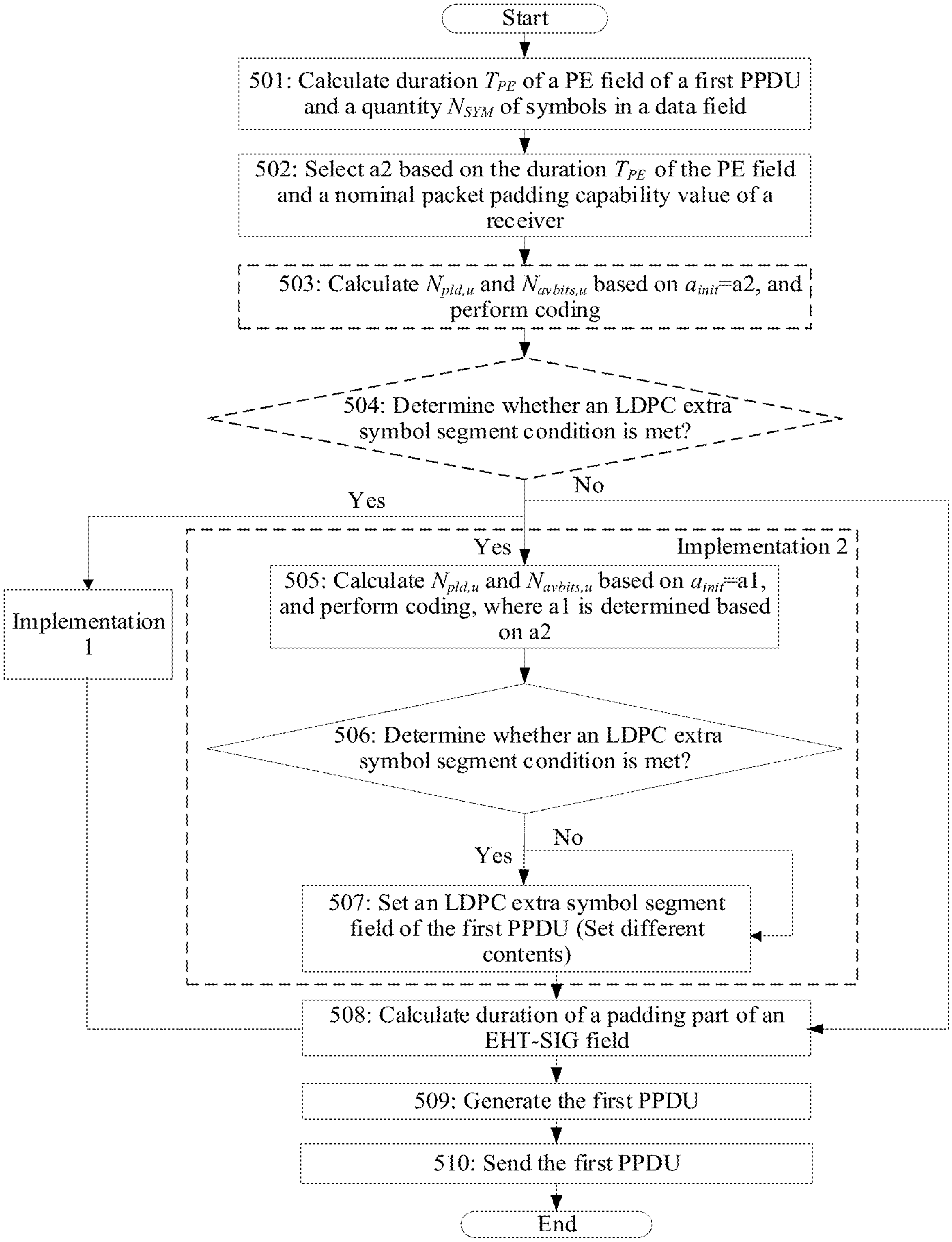
FIG. 11 is another flowchart of generating and sending a first PPDU by a transmitter according to this disclosure.

The following describes the solution 3 with reference to FIG. 11.

FIG. 11 is another flowchart of generating and sending a first PPDU by a transmitter according to this disclosure and includes the following steps.

Step 501: The transmitter selects the duration $T_{PE}$ of the PE field, and calculates $N_{SYM}$.

Optionally, in an example, the transmitter always selects maximum duration of the PE field allowed in a communication standard.

For example, when at least one user uses at least eight spatial streams, or resource units (RUs) or multiple resource units (MRUs) greater than or equal to 2×996 subcarriers are allocated, or a 4096-quadrature amplitude modulation (QAM) scheme is used, the transmitter may select a PE field of 20 microseconds, or select a PE field of 16 microseconds in another case. An advantage of selecting $T_{PE}$ by the transmitter in this way is that the requirement on nominal data padding capabilities of all receivers can be definitely met.

In another example, the transmitter may alternatively select shortest duration from duration of the PE field that can meet the requirement on the nominal packet padding capability of the receiver.

After the duration $T_{PE}$ of the PE field is selected, the quantity $N_{SYM}$ of symbols in the data field of the first PPDU is calculated according to the following formula (17):

$$N_{SYM} = \left\lfloor \frac{TXTIME_{target} - T_{preamble\_initial} - T_{PE} - T_{SE}}{T_{SYM}} \right\rfloor, \tag{17}$$

where $TXTIME_{target}$ represents the first duration, $T_{preamble\_initial}$ is initial duration of the preamble, $T_{PE}$ is the selected duration of the PE field, and $T_{SE}$ is signal extension duration, where the value is 6 microseconds when sending is performed in a 2.4 GHz frequency band, or the value of is 0 microseconds when sending is performed in a 5 GHz or 6 GHz frequency band. $T_{SYM}$ is duration of one OFDM symbol in the data field.

It should be noted that in the solution in which PPDU alignment is implemented by using the duration of the EHT-SIG field, the initial duration of the preamble of the first PPDU is used. The initial duration is duration of the preamble of the first PPDU before the padding part of the EHT-SIG field is added. After the padding part of the EHT-SIG field is added, the preamble includes the initial part and the padding part of the EHT-SIG field. Therefore, the duration of the preamble is increased by the duration of the padding part of the EHT-SIG field based on the initial duration of the preamble. The initial part of the EHT-SIG field is enough to carry required signaling indication information. The following describes in detail the padding part of the EHT-SIG field.

The transmitter calculates remaining duration according to the following formula (18):

$$T_{additional\_EHT\_SIG\_est} = TXTIME_{target} - T_{preamble\_initial} - T_{data} - T_{PE} - T_{SE} \tag{18}$$

It should be understood that, in this solution, the padding part of the EHT-SIG field is determined based on the remaining duration. Therefore, the remaining duration is represented as $T_{additional\_EHT\_SIG\_est}$.

Figure 12:
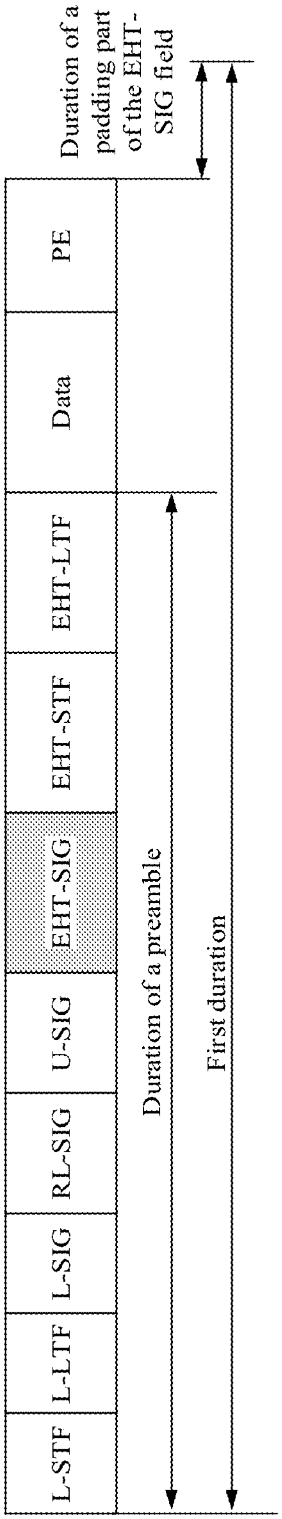
FIG. 12 depicts an EHT PPDU obtained before an EHT-SIG field is padded according to this disclosure.

FIG. 12 shows an EHT PPDU obtained before an EHT-SIG field is padded according to this disclosure. It should be noted that the duration of the preamble in FIG. 12 is the initial duration of the preamble.

Step 502: The transmitter selects a second pre-forward error correction padding factor a2 based on $T_{PE}$ and the nominal packet padding capability value of the receiver.

In step 502, if the duration of the PE field selected in step 501 already meets the requirement on the nominal packet padding capability of the receiver, a2 may be freely selected. That is, the duration of the PE field ensures that the receiver has enough processing time, and the transmitter may select a2 without being affected by the nominal packet padding capability of the receiver.

Step 503: The transmitter calculates $N_{pld,u}$ and $N_{avbits,u}$ based on $a_{init}$=a2, and performs coding.

Step 504: The transmitter determines whether an LDPC extra symbol segment condition is met.

If the LDPC extra symbol segment condition is not met, the transmitter performs step 507.

If the LDPC extra symbol segment condition is met, two implementations are provided, and are denoted as an implementation 1 and an implementation 2 below.

Implementation 1:

The transmitter first updates $N_{SYM}$ and a pre-forward error correction padding factor a according to the following formula (19):

$$N_{SYM} = N_{SYM,init};\quad a = a_{init} + 1,\ a_{init} \neq 4 \tag{19}$$

The transmitter determines, based on the updated $N_{SYM}$ and a, whether the requirement on the nominal packet padding capability of the receiver is met. If the requirement is not met, the remaining duration is greater than or equal to 4 microseconds, and the duration of the PE field does not reach a maximum length allowed in a communication standard, the duration of the PE field is extended by 4 microseconds, to meet the requirement on the nominal packet padding capability of the receiver.

Therefore, $T_{PE}$ meets the following formula (20):

$$T_{PE} = T_{PE} + 4 \tag{20}$$

Because the duration of the $T_{PE}$ field is increased by 4 microseconds, the remaining duration is reduced by 4 microseconds, that is, $T_{additional\_EHT\_SIG\_est}$ meets a formula (21):

$$T_{additional\_EHT\_SIG\_est} = T_{additional\_EHT\_SIG\_est} - 4 \tag{21}$$

That is, in the implementation 1, the duration of the PE field of the first PPDU finally generated by the transmitter is increased by 4 microseconds that are added to the selected duration $T_{PE}$ of the PE field in step 501.

Implementation 2:

In the implementation 2, the transmitter performs step 505.

It should be noted that step 503 and step 504 are optional steps, as shown in a dashed box in FIG. 11. In other words, in step 502, after selecting a2, the transmitter may directly perform step 505, that is, determine $a_{init}$ as a1, where a1 is determined based on a2.

Step 505: The transmitter calculates $N_{pld,u}$ and $N_{avbits,u}$ based on $a_{init}$=a1, and performs coding.

In the foregoing, a1 is determined according to a2. For details, refer to the foregoing formula (16):

$$\begin{cases} a1 = 4,\ N_{SYM,init} = N_{SYM} - 1, & \text{if } a2 = 1 \\ a1 = a2 - 1,\ N_{SYM,init} = N_{SYM}, & a2 = 2, 3, 4 \end{cases}$$

The transmitter calculates $N_{pld,u}$ and $N_{avbits,u}$ based on $a_{init}$=a1, and performs EHT MU PPDU coding based on $N_{pld,u}$ and $N_{avbits,u}$. After the coding, $N_{shrt,u}$ and $N_{punc,u}$ are obtained. In this way, the transmitter may determine, based on $N_{shrt,u}$ and $N_{punc,u}$, whether the LDPC extra symbol segment condition is met.

It should be noted that, if the transmitter performs step 503 and step 504 after step 502, and performs step 505 based on a determining result in step 504, in step 505, the transmitter sets $a_{init}$ to a1, that is, the transmitter updates $a_{init}$ from a2 to a1. In addition, $N_{SYM,\ init}$ also is re-determined according to formula (16). Then, the transmitter updates $N_{pld,u}$ and $N_{avbits,u}$ based on $a_{init}$=a1 and the re-determined $N_{SYM,\ init}$. Further, $N_{shrt,u}$ and $N_{punc,u}$ are updated based on the updated $N_{pld,u}$ and $N_{avbits,u}$, and it is determined, based on the updated $N_{shrt,u}$ and $N_{punc,u}$, whether the LDPC extra symbol segment condition is met.

Step 506: The transmitter determines whether the LDPC extra symbol segment condition is met.

Similar to the foregoing solution 1, the transmitter determines whether the LDPC extra symbol segment condition is met in both step 504 and step 506. However, the LDPC extra symbol segment condition in step 504 is set based on $a_{init}$=a2, that is, is set based on a2. In step 505, $a_n$a is updated to a1. Therefore, the LDPC extra symbol segment condition in step 506 is set based on $a_{init}$=a1, that is, is set based on a1.

Step 507: The transmitter sets the LDPC extra symbol segment field of the first PPDU according to whether the LDPC extra symbol segment condition is met.

As described above, in step 504, if the transmitter determines that the LDPC extra symbol segment condition is not met, the transmitter directly performs step 507. In this case, the transmitter sets the LDPC extra symbol segment field to a second value, the second value indicates that no LDPC extra symbol segment are to be added, and the LDPC extra symbol segment field carries a2.

If the transmitter sets the LDPC extra symbol segment field based on the determining result in step 506, the transmitter sets the LDPC extra symbol segment field according to the following principles.

If the LDPC extra symbol segment condition is met, the transmitter sets the LDPC extra symbol segment field to be 1, and the LDPC extra symbol segment field carries a2.

If the LDPC extra symbol segment condition is not met, the transmitter sets the LDPC extra symbol segment field to be 0, and the LDPC extra symbol segment field carries a1.

Step 508: The transmitter calculates the duration of the padding part of the EHT-SIG field of the first PPDU.

Further, the transmitter calculates the duration (denoted as $T_{additional\_EHT\_SIG}$ below) of the padding part of the EHT-SIG field according to a formula (22):

$$T_{additonal\_EHT\_SIG} = 4\times\left\lfloor\frac{T_{additional\_EHT\_SIG\_est}}{4}\right\rfloor \text{ or } 4\times\left\lceil\frac{T_{additional\_EHT\_SIG\_est}}{4}\right\rceil, \tag{22}$$

where $T_{additional\_EHT\_SIG}$ represents the duration of the padding part of the EHT-SIG field, $T_{additional\_EHT\_SIG\_est}$ represents the remaining duration, $\lfloor\ \rfloor$ represents rounding down, and $\lceil\ \rceil$ represents rounding up.

It should be noted that the remaining duration $T_{addinonal\_EHT\_SIG\_est}$ in the formula (22) is remaining duration obtained after updating according to the formula (21).

Step 509: The transmitter generates the first PPDU.

Figure 13:
FIG. 13 depicts an EHT PPDU obtained after an EHT-SIG field is padded according to this disclosure.

FIG. 13 shows an EHT PPDU obtained after an EHT-SIG field is padded according to this disclosure. It may be learned that, after the EHT-SIG field is padded (or, a padding part is added to the EHT-SIG field based on the initial part of the EHT-SIG field), the duration of the preamble is also correspondingly increased. Further, the duration of the padding part of the EHT-SIG field is added based on the initial duration of the preamble.

Step 510: The transmitter sends the first PPDU.

In the solution 3, the transmitter pads the EHT-SIG field based on a limitation on the first time, to align the end time of the first PPDU with the first time. Compared with the foregoing solution 1 and solution 2, in the solution 3, the duration of the PE field may be freely selected, and is more flexible.

In addition, it should be understood that the procedure in FIG. 12 is merely intended to facilitate understanding of the solution of this disclosure, and a process in which the transmitter generates the first PPDU is divided into different steps. Actually, in this disclosure, the process in which the transmitter generates the first PPDU is a process in which the transmitter determines duration of each field and sets fields of each field. Therefore, step 507 and step 508 may also be combined into step 509, and are considered as steps in the process of generating the first PPDU. Therefore, the steps in FIG. 12 are merely used as examples, and these steps may also be combined into fewer steps, or may be divided into more steps, which should not constitute any limitation on the solution itself.

Similarly, to simplify the complexity of selecting the pre-forward error correction padding factor and reduce the calculation amount in the selection process, a solution 4 is provided below.

Figure 14:
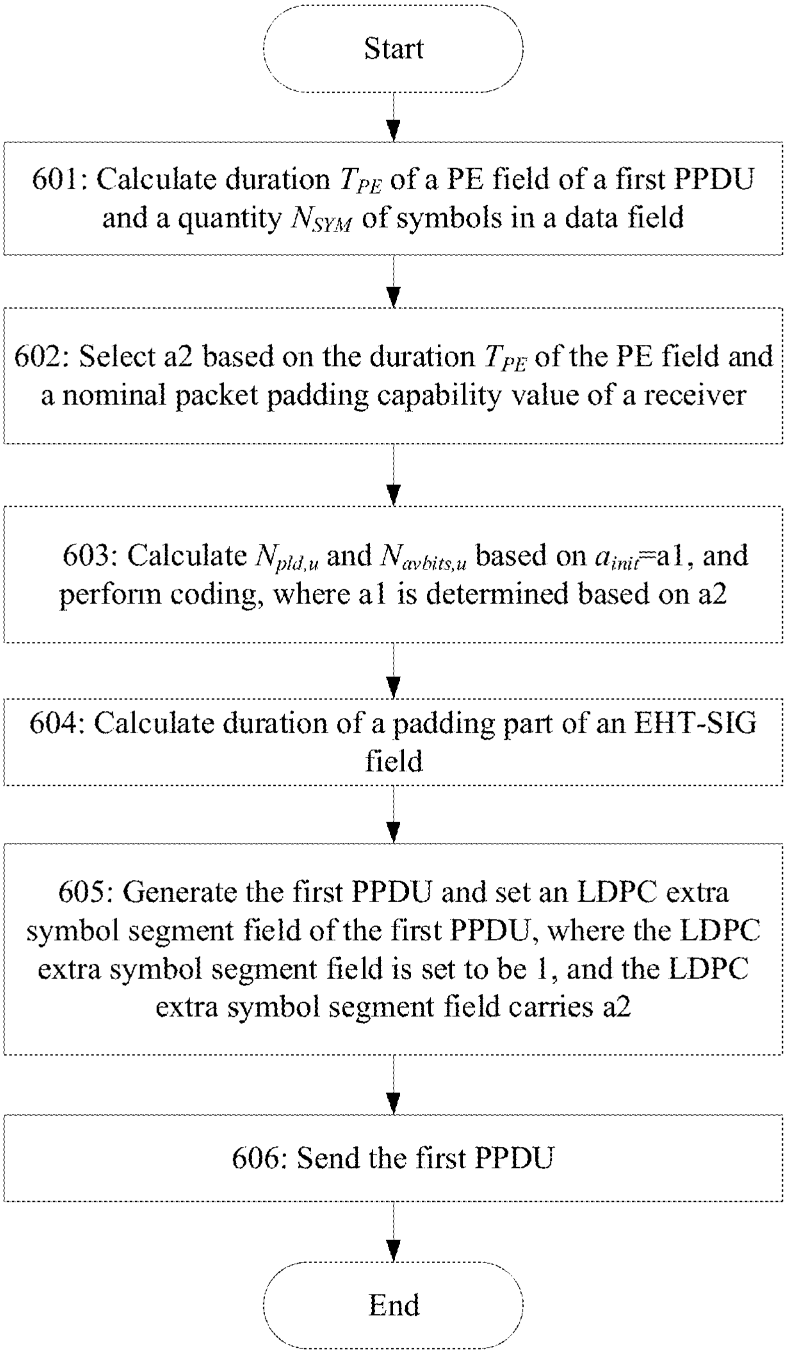
FIG. 14 is another flowchart of generating and sending a first PPDU by a transmitter according to this disclosure.

Solution 4:

FIG. 14 is another flowchart of generating and sending a first PPDU by a transmitter according to this disclosure.

Step 601: The transmitter selects the duration $T_{PE}$ of the PE field, and calculates $N_{SYM}$.

Step 602: The transmitter selects a2 based on $T_{PE}$ and the nominal packet padding capability value of the receiver.

Step 603: The transmitter calculates $N_{pld,u}$ and $N_{avbits,u}$ based on $a_{init}$=a1, and performs coding. In the foregoing, a1 is determined according to a2.

Step 604: The transmitter calculates the duration of the padding part of the EHT-SIG

FIELD

Step 605: The transmitter generates the first PPDU.

Further, the transmitter sets an LDPC extra symbol segment field of the first PPDU. The transmitter sets the LDPC extra symbol segment field to be 1, and the LDPC extra symbol segment field carries a2.

Step 606: The transmitter sends the first PPDU.

It can be learned that, in the solution 4, in addition to that the duration of the PE field is more flexible and freely selected, the transmitter does not calculate whether the LDPC extra symbol segment condition is met, so that the process of selecting the pre-forward error correction padding factor is greatly simplified, and the calculation complexity and the calculation amount are reduced.

In addition to the PE field and the EHT-SIG field, PPDU alignment may also be implemented by controlling duration of the EHT-LTF field.

(3) EHT-LTF Field.

When a type of the EHT-LTF field of the first PPDU is 1×EHT-LTF (in this case, duration of each symbol in the EHT-LTF field except a GI part is 3.2 microseconds), or 2×EHT-LTF (in this case, duration of each symbol in the EHT-LTF field except a GI part is 6.4 microseconds), the transmitter may implement PPDU alignment by padding the EHT-LTF field.

In other words, in this solution, the EHT-LTF field includes an initial part and a padding part. A process of calculating the duration of the padding part of the EHT-LTF field is similar to a process of calculating the padding part of the EHT-SIG field, and only a formula for calculating the padding part of the EHT-SIG field is to be replaced with the following formula (23):

$$T_{additonal\_EHT\_LTF} = T_{EHT-LTF,SYM} \times \left\lfloor \frac{T_{additional\_EHT\_SIG\_est}}{T_{EHT-LTF,SYM}} \right\rfloor \text{ or } T_{EHT-LTF,SYM} \times \left\lceil \frac{T_{additional\_EHT\_SIG\_est}}{T_{EHT-LTF,SYM}} \right\rceil, \tag{23}$$

where $T_{EHT-LTF,SYM}$ is duration of one OFDM symbol in the EHT-LTF field, and $T_{additional\_EHT\_SIG\_est}$ represents remaining duration. The remaining duration $T_{additional\_EHT\_SIG\_est}$ may be calculated according to the foregoing formula (18). Details are not described herein again.

In summary, the transmitter may first obtain the remaining duration through calculation by using the solution 3 or the solution 4, and then calculate the duration of the padding part of the EHT-LTF field according to the formula (23). The EHT-LTF field of the first PPDU finally generated by the transmitter includes the initial part and the padding part.

It should be understood that, the EHT-LTF field is selected to be padded to implement PPDU alignment, because a duration granularity of each symbol except the guard interval in the 1×EHT-LTF and the 2×EHT-LTF is relatively small, and is close to 4 microseconds, and an alignment requirement can be met. In addition, if the solution 3 or the solution 4 is used in combination with the solution for padding the EHT-LTF herein, only a total length of the padding part of the EHT-LTF field and the EHT-SIG field is to be as close as possible to remaining duration $T_{additional\_EHT\_SIG\_est}$, to implement alignment.

A person skilled in the art may learn, with reference to the foregoing process of calculating the duration of the padding part of the EHT-SIG field, how to calculate the duration of the padding part of the EHT-LTF field. Details are not described herein again to avoid repetition in the descriptions.

(4) Delay the Sending Time of the First PPDU.

In this solution, the transmitter first calculates the remaining duration according to a formula (24):

$$T_{additional\_EHT\_SIG\_est} = TXTIME_{target} - T_{preamble} - T_{data} - T_{PE} - T_{SE} \tag{24}$$

After obtaining the remaining duration, the transmitter delays the start time of the first PPDU. Further, the delayed duration may be the remaining duration $T_{additional\_EHT\_sIG\_est}$.

Figure 15:
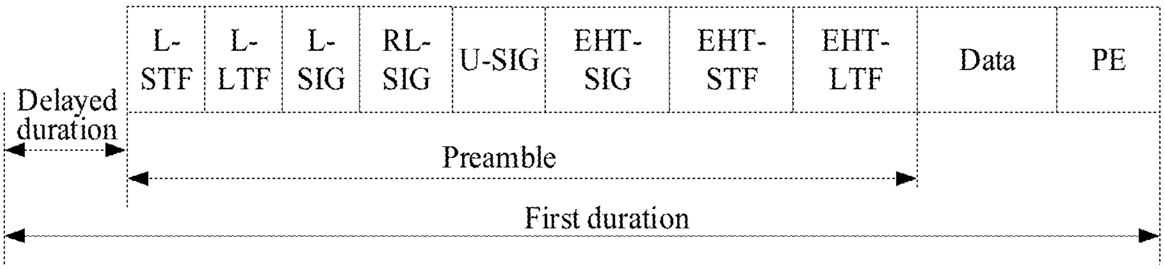
FIG. 15 is a schematic diagram of implementing first PPDU alignment by delaying a sending time of a first PPDU according to this disclosure.

FIG. 15 is a schematic diagram of implementing first PPDU alignment by delaying a sending time of a first PPDU according to this disclosure. As shown in FIG. 15, the transmitter calculates remaining duration based on the first duration, and then delays the start time of the first PPDU after the remaining duration.

It should be noted that, if the delay time is excessively long, an air interface may be preempted by a third-party device, and the transmitter may miss a sending opportunity. Therefore, the transmitter may delay the start time of the first PPDU in combination with the foregoing solutions or implementations thereof, to control the delay duration not to exceed a threshold, for example, 4 microseconds.

(5) The Foregoing Solutions are Used Together.

The foregoing describes some solutions for implementing PPDU alignment. Based on this, a person skilled in the art may combine the foregoing solutions or implementations of any one of the solutions to implement PPDU alignment.

Several solutions for implementing EHT MU PPDU alignment are described above, and a solution for implementing EHT TB PPDU alignment is described below.

2. EHT TB PPDU Alignment.

As described above, for the EHT TB PPDU, an AP first sends a trigger frame. To implement PPDU alignment, trigger frames on different links are first aligned as much as possible.

To ensure alignment of the trigger frames as much as possible, the transmitter may select different types of PPDUs to carry trigger frames on different links.

Figure 16A:
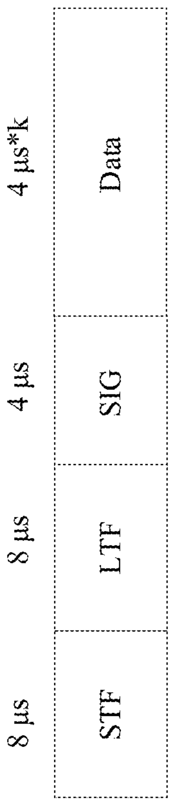
FIG. 16A, FIG. 16B, and FIG. 16C depict structures of several different types of PPDUs according to this disclosure.
Figure 16B:
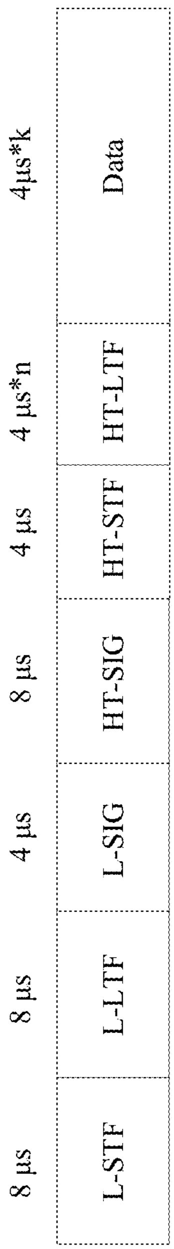
Figure 16C:
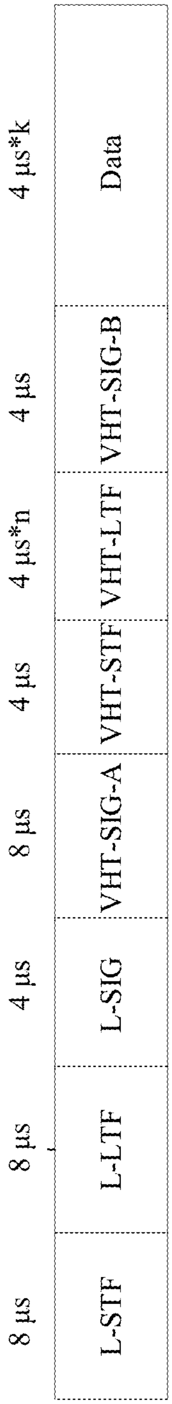

FIGS. 16A, 16B, and 16C shows structures of several different types of PPDUs according to this disclosure. In FIGS. 16A, 16B, and 16C are respectively a non-high throughput (non-HT) PPDU, a high throughput (HT) PPDU, and a very high throughput (VHT) PPDU. A length of each symbol of the three types of PPDUs is 4 microseconds, and there is no PE field. Therefore, an alignment requirement with an error of 4 microseconds can be easily met.

Because the length of each symbol of the three types of PPDUs is 4 microseconds, a quantity of symbols of the first PPDU may be calculated according to the following formula:

$$N_{SYM} = \left\lfloor \frac{TXTIME_{target} - T_{preamble} - T_{PE} - T_{SE}}{4} \right\rfloor \text{ or } N_{SYM} = \left\lceil \frac{TXTIME_{target} - T_{preamble} - T_{PE} - T_{SE}}{4} \right\rceil,$$

where $TXTIME_{target}$ represents the first duration. $T_{preamble}$ is a duration of a preamble, and $T_{SE}$ is signal extension duration, where the value is 6 microseconds when sending is performed in a 2.4 GHz frequency band, or the value of is 0 microseconds when sending is performed in a 5 GHz or 6 GHz frequency band. $T_{SYM}$ represents duration of one OFDM symbol in the data field of the first PPDU.

Figure 17A:
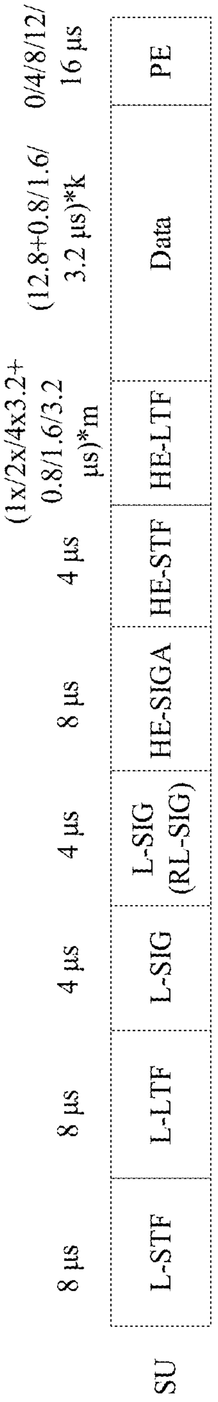
FIG. 17A, FIG. 17B, and FIG. 17C depict several High Efficiency (HE) PPDU formats according to this disclosure.
Figure 17B:
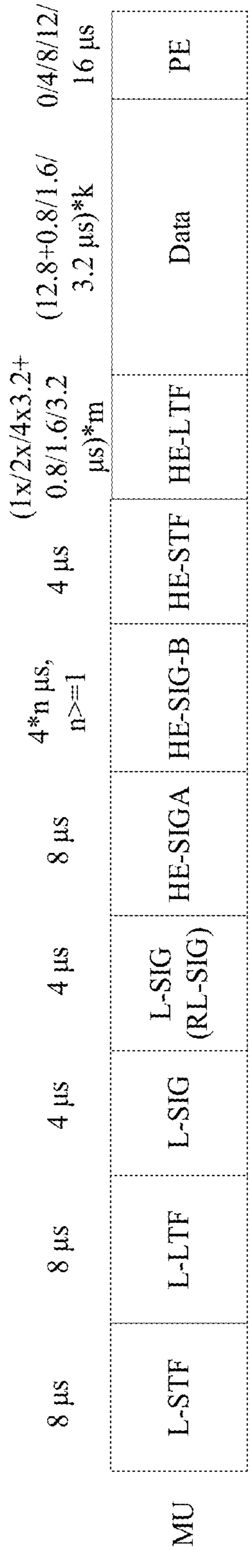
Figure 17C:
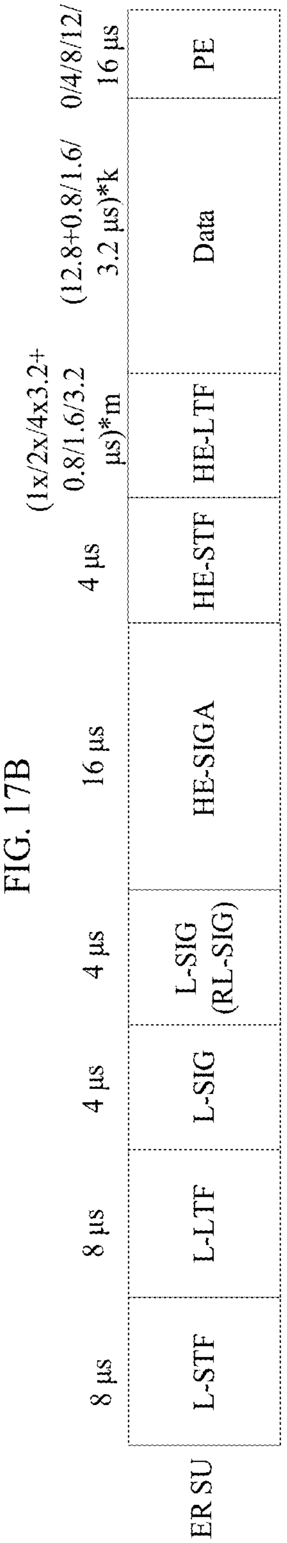

If the transmitter uses the HE PPDU to carry the trigger frame, the HE PPDU has four formats: an HE SU PPDU, an HE MU PPDU, an HE Extended Range (ER) SU PPDU, and an HE TB PPDU. As shown in FIGS. 17A, 17B, and 17C, the trigger frame may be carried in the first three formats.

FIGS. 17A, 17B, and 17C shows several HE PPDU formats according to this disclosure. In FIGS. 17A, 17B, and 17C are respectively the HE SU PPDU, the HE MU PPDU, and the HE ER SU PPDU. The three formats are similar to the EHT MU PPDU, and can use any one of the solutions for aligning the EHT MU PPDU described above.

If start times of PPDUs that carry trigger frames and that are on two or more links are the same, the transmitter selects PPDUs of a same length, so that alignment of the trigger frames can be ensured.

However, for the triggered EHT TB PPDU, when the AP generates the trigger frame, provided that a same uplink length is selected for all links, it can be ensured that EHT TB PPDUs sent on all links are aligned within an error range.

Further, the AP may select a PE field of same duration, a same quantity of symbols in a data field, a same guard interval and a same type of the EHT-LTF field, a same quantity of symbols in the EHT-LTF field, a same pre-FEC padding factor, an LDPC extra symbol segment field of same duration, and a PE disambiguity field of same duration, to simplify factor selection and implement alignment.

Figure 18:
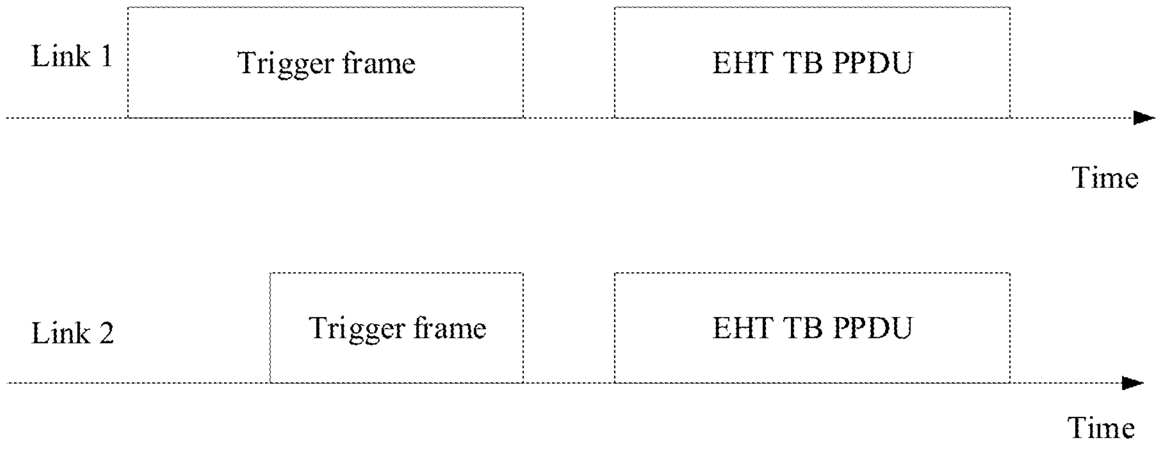
FIG. 18 is a schematic diagram of implementing EHT TB PPDU alignment according to this disclosure.

FIG. 18 is a schematic diagram of implementing EHT TB PPDU alignment according to this disclosure.

As shown in FIG. 18, it is assumed that the transmitter triggers, by using a trigger frame 1, the receiver to send an EHT TB PPDU 1 on a link 1, and triggers, by using a trigger frame 2, the receiver to send an EHT TB PPDU 2 on a link 2. To implement alignment between the EHT TB PPDU 1 and the EHT TB PPDU 2, the transmitter first ensures that an end time of the trigger frame 1 is aligned with an end time of the trigger frame 2. Based on this, the transmitter selects the EHT TB PPDU 1 and the EHT TB PPDU 2 with a same uplink length, to implement alignment between the EHT TB PPDU 1 and the EHT TB PPDU 2.

Similar to the EHT MU PPDU alignment in the foregoing solution, EHT TB PPDU alignment may be alignment within a specific error range. For example, a time interval between the end time of the EHT TB PPDU 1 and the end time of the EHT TB PPDU 2 falls within a specific error range, and the error range may be, for example, 4 microseconds or 8 microseconds.

In FIG. 1, FIGS. 16A-16C, and FIGS. 17A-17C, * represents a multiplication operation.

In addition, in the formulas in embodiments of this disclosure, $\lfloor\ \rfloor$ represents rounding down, and $\lceil\ \rceil$ represents rounding up.

The foregoing describes in detail the method for sending a PPDU in this disclosure. The following describes a communication apparatus for sending a PPDU provided in this disclosure.

Figure 19:
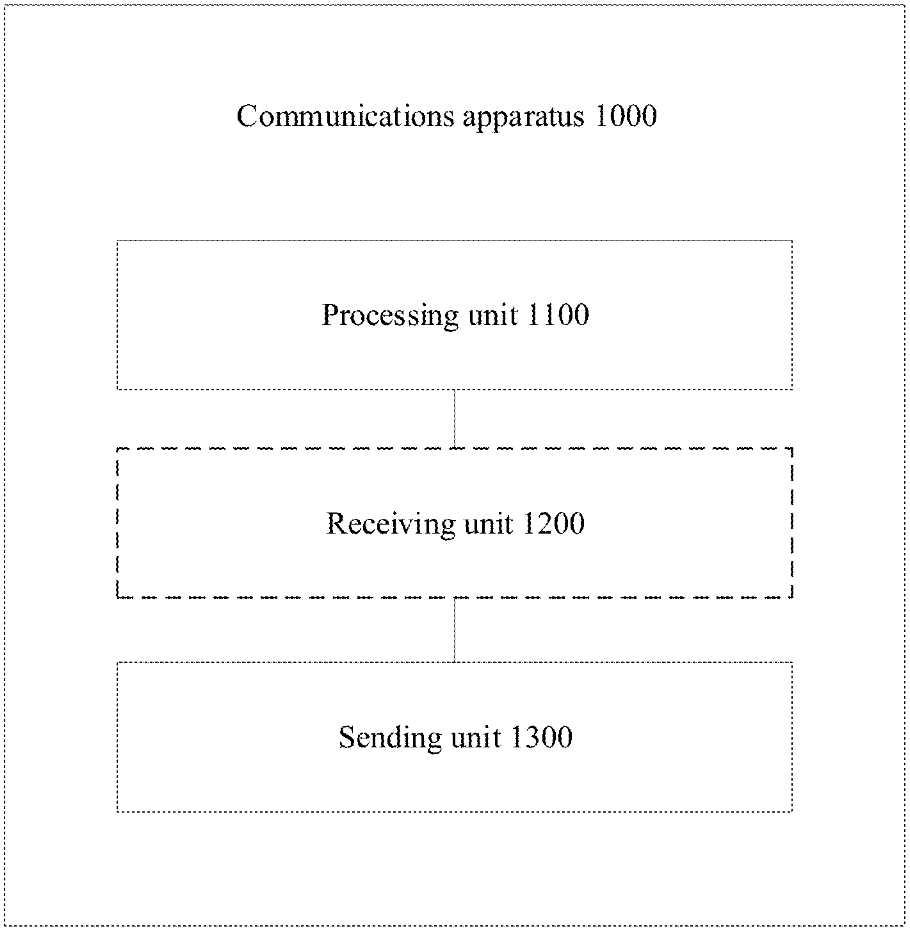
FIG. 19 is a schematic block diagram of a communication apparatus according to this disclosure.

FIG. 19 is a schematic block diagram of a communication apparatus according to this disclosure. As shown in FIG. 19, the communication apparatus 1000 includes a processing unit 1100 and a sending unit 1300. Optionally, the communication apparatus may further include a receiving unit 1200, as shown by a dashed box in FIG. 19.

Optionally, the communication apparatus 1000 may correspond to the transmitter in this embodiment of this disclosure. In this case, units of the communication apparatus 1000 are configured to implement the following functions.

The processing unit 1100 is configured to control duration of one or more fields of a PE field, an EHT-SIG field, and an EHT-LTF field of a first PPDU, and/or delay a sending time of the first PPDU, so that an error between an end time of the first PPDU and a first time is not greater than an error threshold.

The sending unit 1300 is configured to send the first PPDU.

Optionally, in an embodiment, the first PPDU includes a preamble, a data field, and the PE field, duration of the PE field is determined based on first duration, duration of the preamble of the first PPDU, and duration of a symbol in the data field, and the first duration is duration between the first time and a start time of the first PPDU.

Optionally, in an embodiment, a quantity of symbols in the data field is determined based on the first duration, the duration of the preamble, and the duration of the symbol in the data field.

Optionally, in an embodiment, the first PPDU includes a preamble, a data field, and the PE field, the preamble includes the EHT-SIG field, and the EHT-SIG field includes an initial part and a padding part.

Duration of the padding part in the EHT-SIG field is determined based on first duration, initial duration of the preamble, duration of the PE field, and duration of a symbol in the data field, the initial duration of the preamble does not include the duration of the padding part in the EHT-SIG field, and the first duration is duration between the first time and a start time of the first PPDU.

The duration of the padding part is a multiple of 4 microseconds.

Optionally, in an embodiment, a quantity of symbols in the data field is determined based on the first duration, the initial duration of the preamble, the duration of the PE field, and the duration of the symbol in the data field.

Optionally, in an embodiment, the EHT-SIG field of the first PPDU carries an LDPC extra symbol segment field.

The LDPC extra symbol segment field is set to be a second value, the EHT-SIG field carries a second pre-forward error correction padding factor, the second value indicates that no LDPC extra symbol segment is to be added, the LDPC extra symbol segment field is set when an LDPC extra symbol segment condition is not met, and the LDPC extra symbol segment condition is set based on the second pre-forward error correction padding factor. The second pre-forward error correction padding factor is determined based on the duration of the PE field and a nominal packet padding capability of a receiver.

The LDPC extra symbol segment field is set to be a first value, the EHT-SIG field carries a second pre-forward error correction padding factor, the first value indicates that an LDPC extra symbol segment is to be added, the LDPC extra symbol segment field is set when an LDPC extra symbol segment condition is met, and the LDPC extra symbol segment condition is set based on a first pre-forward error correction padding factor. The first pre-forward error correction padding factor is determined based on the duration of the PE field and a nominal packet padding capability of a receiver.

The LDPC extra symbol segment field is set to be a second value, the EHT-SIG field carries a first pre-forward error correction padding factor, the second value indicates that no LDPC extra symbol segment is to be added, the LDPC extra symbol segment field is set when an LDPC extra symbol segment condition is not met, and the LDPC extra symbol segment condition is set based on the first pre-forward error correction padding factor. The first pre-forward error correction padding factor is determined based on the duration of the PE field and a nominal packet padding capability of a receiver.

In this embodiment of this disclosure, the first pre-forward error correction padding factor is determined based on the second pre-forward error correction padding factor, and the first PPDU is encoded by using the first pre-forward error correction padding factor, so that duration that can be used by the receiver to decode the first PPDU is prolonged in comparison with duration of encoding the first PPDU by using the second pre-forward error correction padding factor.

Optionally, in an embodiment, the EHT-SIG field of the first PPDU carries an LDPC extra symbol segment field, the LDPC extra symbol segment field is set to be a first value, the LDPC extra symbol segment field carries a second pre-forward error correction padding factor, the first value indicates that an LDPC extra symbol segment is to be added, and the second pre-forward error correction padding factor is determined based on the duration of the PE field and a nominal packet padding capability of a receiver.

Optionally, in an embodiment, the first pre-forward error correction padding factor and the second pre-forward error correction padding factor meet the following formula:

$$\begin{cases} a1 = 4, & a2 = 1 \\ a1 = a2 - 1, & a2 = 2, 3, 4 \end{cases},$$

where a1 represents the first pre-forward error correction padding factor, and a2 represents the second pre-forward error correction padding factor.

Optionally, in an embodiment, the duration of the PE field is increased by 4 microseconds.

The duration of the PE field is increased by 4 microseconds in the following case: when an LDPC extra symbol segment condition is met, a requirement on a nominal packet padding capability of a receiver is not met after an LDPC extra symbol segment is added, remaining duration is greater than or equal to 4 microseconds, and the duration of the PE field does not reach allowed maximum duration.

The LDPC extra symbol segment condition is set based on a second pre-forward error correction padding factor, and the second pre-forward error correction padding factor is determined based on the duration of the PE field obtained before 4 microseconds are added and the nominal packet padding capability of the receiver.

The remaining duration is determined based on the first duration, the duration of the preamble, the duration of the symbol in the data field, and the duration of the PE field obtained before 4 microseconds are added.

In the foregoing implementations, the receiving unit 1200 and the sending unit 1300 may also be integrated into one transceiver unit, and have both of a receiving function and a sending function. This is not limited herein.

In embodiments of the transmitter corresponding to the communication apparatus 1000, the processing unit 1100 is configured to perform processing and/or an operation implemented inside the transmitter in addition to sending and receiving actions. The receiving unit 1200 is configured to perform a receiving action, and the sending unit 1300 is configured to perform a sending action.

For example, in FIG. 5, the processing unit 1100 performs step 210, and the sending unit 1300 performs step 220.

For another example, in FIG. 6, the processing unit 1100 performs step 301 to step 307, and the sending unit 1300 performs step 308.

For another example, in FIG. 9, the processing unit 1100 performs step 401 to step 404, and the sending unit 1300 performs step 405.

For another example, in FIG. 11, the processing unit 1100 performs step 501 to step 509, and the sending unit 1300 performs step 510.

For another example, in FIG. 14, the processing unit 1100 performs step 601 to step 605, and the sending unit 1300 performs step 606.

Figure 20:
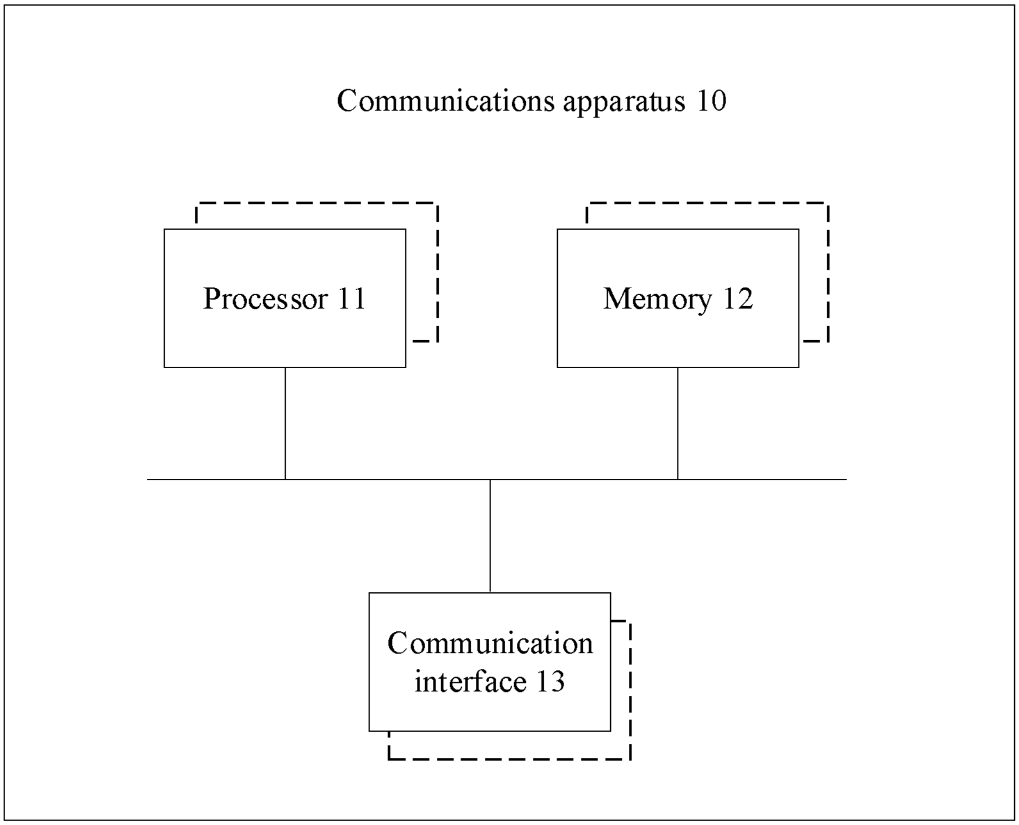
FIG. 20 is a schematic diagram of a structure of a communication apparatus according to this disclosure.

FIG. 20 is a schematic diagram of a structure of a communication apparatus 10 according to this disclosure. As shown in FIG. 20, the communication apparatus 10 includes one or more processors 11, one or more memories 12, and one or more communication interfaces 13. The processor 11 is configured to control the communication interface 13 to receive and send a signal. The memory 12 is configured to store a computer program. The processor 11 is configured to invoke the computer program from the memory 12 and run the computer program, so that the communication apparatus 10 performs processing performed by the transmitter in the method embodiments of this disclosure.

For example, the processor 11 may have a function of the processing unit 1100 shown in FIG. 19, and the communication interface 13 may have a function of the receiving unit 1200 and/or the sending unit 1300 shown in FIG. 19. Further, the processor 11 may be configured to perform processing or an operation performed inside the communication apparatus, and the communication interface 13 is configured to perform sending and/or a receiving operation performed by the communication apparatus.

In an implementation, the communication apparatus 10 may be the transmitter in the method embodiment. In this implementation, the communication interface 13 may be a transceiver. The transceiver may include a receiver and/or a transmitter. Optionally, the processor 11 may be a baseband apparatus, and the communication interface 13 may be a radio frequency apparatus.

In another implementation, the communication apparatus 10 may be a chip (or a chip system) installed at a transmitter. In this implementation, the communication interface 13 may be an interface circuit or an input/output interface.

Optionally, a dashed box behind a component (for example, the processor, the memory, or the communication interface) in FIG. 20 indicates that there may be more than one component.

In another implementation, the communication interface 13 may include a radio frequency circuit and an antenna. The radio frequency circuit and the antenna may be disposed independently of a processor that performs baseband processing. For example, in a distributed scenario, the radio frequency circuit and the antenna may be disposed remotely and independent of a communication apparatus.

The processor may be configured to perform, for example, but not limited to, baseband-related processing, and the transceiver may be configured to perform, for example, but not limited to, radio frequency receiving and sending. The foregoing components may be separately disposed on chips that are independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, more and more components may be integrated on a same chip. For example, the digital baseband processor may be integrated on a same chip with a plurality of application processors (for example, but not limited to a graphics processing unit and a multimedia processor). The chip may be referred to as a system on chip. Whether components are independently disposed on different chips or are integrated and disposed on one or more chips usually depends on specific requirements of a product design. Specific implementation forms of the foregoing components are not limited in this embodiment of the present disclosure.

Optionally, the memory and the processor in the foregoing apparatus embodiments may be units physically independent of each other, or the memory and the processor may be integrated together. This is not limited in this specification.

In addition, this disclosure further provides a computer-readable storage medium. The computer-readable storage medium stores computer instructions. When the computer instructions are run on a computer, an operation and/or processing performed by the transmitter in the method embodiments of this disclosure is performed.

In addition, this disclosure further provides a computer program product. The computer program product includes computer program code or instructions. When the computer program code or the instructions is/are run on a computer, an operation and/or processing performed by the transmitter in the method embodiments of this disclosure is performed.

In addition, this disclosure further provides a chip. The chip includes a processor, a memory configured to store a computer program is disposed independent of the chip, and the processor is configured to execute the computer program stored in the memory, so that a transmitter on which the chip is installed performs an operation and/or processing performed by the transmitter in any one of the method embodiments.

Further, the chip may include a communication interface. The communication interface may be an input/output interface, an interface circuit, or the like. Further, the chip may include the memory.

Optionally, there may be one or more processors, there may be one or more memories, and there may be one or more memories.

In addition, this disclosure further provides a communication apparatus (for example, may be a chip or a chip system), including a processor and a communication interface. The communication interface is configured to receive (or referred to as input) data and/or information, and transmit the received data and/or information to the processor. The processor processes the data and/or information. The communication interface is further configured to output (or referred to as output) data and/or information processed by the processor, so that an operation and/or processing performed by the transmitter in any one of the method embodiments is performed.

In addition, this disclosure further provides a communication apparatus, including at least one processor. The at least one processor is coupled to at least one memory, and the at least one processor is configured to execute a computer program or instructions stored in the at least one memory, to enable the communication apparatus to perform an operation and/or processing performed by the transmitter in any one of the method embodiments.

In addition, this disclosure further provides a communication device, including a processor and a memory. Optionally, the communication device may further include a transceiver. The memory is configured to store a computer program. The processor is configured to invoke and run the computer program stored in the memory, and control the transceiver to receive and send a signal, so that the communication device performs an operation and/or processing performed by the transmitter in any one of the method embodiments.

The memory in embodiments of this disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random-access memory (RAM), and is used as an external cache. Through example but not limitative description, RAMs in many forms are available, such as a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct Rambus (DR) RAM (DRRAM). It should be noted that the memory in the systems and methods described in this specification includes but is not limited to these and any memory of another proper type.

All or some of the methods provided in the foregoing embodiments may be implemented by using software, hardware, firmware, or any combination thereof. When software is used to implement embodiments, all or a part of embodiments may be implemented in a form of a computer program product. The computer program product may include one or more computer instructions. When the computer program instructions are loaded and executed on a computer, the procedure or functions according to embodiments of this disclosure are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media.

To clearly describe the technical solutions in embodiments of this disclosure, numbers such as “first” and “second” are used in embodiments of this disclosure to distinguish between same items or similar items that have basically same functions and purposes. For example, the first pre-forward error correction padding factor and the second pre-forward error correction padding factor are merely used to distinguish two different pre-forward error correction padding factors. A person skilled in the art may understand that the numbers such as “first” and “second” do not limit a quantity and an execution sequence, and the words such as “first” and “second” do not indicate a definite difference.

In embodiments of this disclosure, “at least one” means one or more, and “a plurality of” means two or more. The term “and/or” describes an association relationship between associated objects, and indicates that three relationships may exist. For example, A and/or B may indicate the following three cases: A exists alone, both A and B exist, and B exists alone, where A and B may be singular or plural. The character “/” generally indicates an “or” relationship between the associated objects. At least one of the following items (pieces) or a similar expression thereof indicates any combination of these items, including any combination of a single item (piece) or a plurality of items (pieces). For example, at least one of a, b, or c may represent a, b, c, a and b, a and c, b and c, or a, b, and c, where a, b, and c may be singular or plural.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In this disclosure, unless otherwise specified, for same or similar parts of embodiments, reference may be made to each other. In embodiments of this disclosure and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The following implementations of this disclosure are not intended to limit the protection scope of this disclosure.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:

controlling a first duration of one or more of a packet extension (PE) field of a physical layer protocol data unit (PPDU), an Extremely High Throughput signal (EHT-SIG) field of the PPDU, or an Extremely High Throughput long training field (EHT-LTF) field of the PPDU, or delaying a sending time of the PPDU to make an error between an end time of the PPDU and a first time be less than or equal to an error threshold, wherein the first time is a target end time of the PPDU;

determining a second duration of a padding part in the EHT-SIG field based on a third duration, an initial duration of a preamble of the PPDU, a fourth duration of the PE field, and a fifth duration of a symbol in a data field of the PPDU, wherein the initial duration does not comprise the second duration, wherein the third duration is between the first time and a start time of the PPDU, wherein the second duration is a multiple of 4 microseconds, wherein the preamble comprises the EHT-SIG field, and wherein the EHT-SIG field comprises an initial part and the padding part; and sending the PPDU.

2. The method of claim 1, further comprising determining a second duration of the PE field based on a third duration, a fourth duration of a preamble of the PPDU, and a fifth duration of a symbol the data field of the PPDU, wherein the third duration is between the first time and a start time of the PPDU.

3. The method of claim 2, further comprising determining a quantity of symbols in the data field based on the third duration, the fourth duration, and the fifth duration.

4. The method of claim 1, further comprising determining a quantity of symbols in the data field based on the third duration, the initial duration, the fourth duration, and the fifth duration.

5. The method of claim 2, further comprising:

determining a second pre-forward error correction padding factor that is carried in the EHT-SIG field based on the second duration and a nominal packet padding capability of a receiver, setting a low-density parity check (LDPC) extra symbol segment condition based on the second pre-forward error correction padding factor, and setting, when the LDPC extra symbol segment condition is not met, an LDPC extra symbol segment field carried in the EHT-SIG field to be a second value, wherein the second value indicates that an LDPC extra symbol segment is not to be added;

determining a first pre-forward error correction padding factor based on the second duration and the nominal packet padding capability, setting the LDPC extra symbol segment condition based on the first pre-forward error correction padding factor, and setting, when the LDPC extra symbol segment condition is met, the LDPC extra symbol segment field to be a first value, wherein the first value indicates that the LDPC extra symbol segment is to be added; or determining the first pre-forward error correction padding factor carried in the EHT-SIG field based on the second duration and the nominal packet padding capability, setting the LDPC extra symbol segment condition based on the first pre-forward error correction padding factor, and setting, when the LDPC extra symbol segment condition is not met, the LDPC extra symbol segment field to be a third value, wherein the third value indicates that the LDPC extra symbol segment is to be added.

6. The method of claim 2, further comprising:

determining a pre-forward error correction padding factor that is carried in a low-density parity check (LDPC) extra symbol segment field based on the second duration and a nominal packet padding capability of a receiver; and setting the LDPC extra symbol segment field carried in the EHT-SIG field to be a first value, wherein the first value indicates that an LDPC extra symbol segment is to be added.

7. The method of claim 5, wherein the first pre-forward error correction padding factor and the second pre-forward error correction padding factor meet the following equations:

$$\begin{cases} a1 = 4, & a2 = 1 \\ a1 = a2 - 1, & a2 = 2, 3, 4 \end{cases},$$

wherein a1 represents the first pre-forward error correction padding factor, and wherein a2 represents the second pre-forward error correction padding factor.

8. The method of claim 1, further comprising increasing the fourth duration by 4 microseconds when a low-density parity check (LDPC) extra symbol segment condition is met, a requirement on a nominal packet padding capability of a receiver is not met after an LDPC extra symbol segment is added, a remaining duration is greater than or equal to 4 microseconds, and the fourth duration does not reach an allowed maximum duration, wherein the LDPC extra symbol segment condition is based on a pre-forward error correction padding factor, wherein the pre-forward error correction padding factor is based on the fourth duration before increasing by 4 microseconds and the nominal packet padding capability, and wherein the remaining duration is based on the third duration, the initial duration, the fifth duration, and the fourth duration before increasing by 4 microseconds.

9. A communication apparatus comprising:

one or more memories configured to store instructions; and one or more processors in communication with the one or more memories and configured to execute the instructions to cause the communication apparatus to:

control a first duration of one or more of a packet extension (PE) field of a physical layer protocol data unit (PPDU), an Extremely High Throughput signal (EHT-SIG) field of the PPDU, or an Extremely High Throughput long training field (EHT-LTF) field of the PPDU or delay a sending time of the PPDU to make an error between an end time of the PPDU and a first time be less than or equal to an error threshold, wherein the first time is a target end time of the PPDU;

determine a second pre-forward error correction padding factor that is carried in the EHT-SIG field based on a second duration and a nominal packet padding capability of a receiver;

set a low-density parity check (LDPC) extra symbol segment condition based on the second pre-forward error correction padding factor;

set, when the LDPC extra symbol segment condition is not met, an LDPC extra symbol segment field carried in the EHT-SIG field to be a second value, wherein the second value indicates that an LDPC extra symbol segment is not to be added; and send the PPDU.

10. The communication apparatus of claim 9, wherein the one or more processors are further configured to determine a second duration of the PE field based on a third duration, a fourth duration of a preamble of the PPDU, and a fifth duration of a symbol in a data field of the PPDU, wherein the third duration is between the first time and a start time of the PPDU.

11. The communication apparatus of claim 10, wherein the one or more processors are further configured to execute the instructions to cause the communication apparatus to determine a quantity of symbols in the data field based on the third duration, the fourth duration, and the fifth duration.

12. The communication apparatus of claim 9, wherein the one or more processors are further configured to execute the instructions to cause the communication apparatus to determine a second duration of a padding part in the EHT-SIG field based on a third duration, an initial duration of a preamble of the PPDU, a fourth duration of the PE field, and a fifth duration of a symbol in a data field of the PPDU, wherein the initial duration does not comprise the second duration, wherein the third duration is between the first time and a start time of the PPDU, wherein the second duration is a multiple of 4 microseconds, wherein the preamble comprises the EHT-SIG field, and wherein the EHT-SIG field comprises an initial part and the padding part.

13. The communication apparatus of claim 12, wherein the one or more processors are further configured to execute the instructions to cause the communication apparatus to determine a quantity of symbols in the data field based on the third duration, the initial duration, the fourth duration, and the fifth duration.

14. The communication apparatus of claim 10, wherein the one or more processors are further configured to execute the instructions to cause the communication apparatus to:

determine a first pre-forward error correction padding factor based on the second duration and the nominal packet padding capability, set the LDPC extra symbol segment condition based on the first pre-forward error correction padding factor, and set, when the LDPC extra symbol segment condition is met, the LDPC extra symbol segment field to be a first value, wherein the first value indicates that the LDPC extra symbol segment is to be added; or determine the first pre-forward error correction padding factor carried in the EHT-SIG field based on the second duration and the nominal packet padding capability, set the LDPC extra symbol segment condition based on the first pre-forward error correction padding factor, and set, when the LDPC extra symbol segment condition is not met, the LDPC extra symbol segment field to be a third value, wherein the third value indicates that the LDPC extra symbol segment is to be added.

15. The communication apparatus of claim 9, wherein the one or more processors are further configured to execute the instructions to cause the communication apparatus to:

determine a pre-forward error correction padding factor that is carried in the LDPC extra symbol segment field based on the second duration and a nominal packet padding capability of a receiver; and set the LDPC extra symbol segment field carried in the EHT-SIG field to be a first value, and wherein the first value indicates that an LDPC extra symbol segment is to be added.

16. The communication apparatus of claim 14, wherein the first pre-forward error correction padding factor and the second pre-forward error correction padding factor meet the following equations:

$$\begin{cases} a1 = 4, & a2 = 1 \\ a1 = a2 - 1, & a2 = 2, 3, 4 \end{cases},$$

wherein a1 represents the first pre-forward error correction padding factor, and wherein a2 represents the second pre-forward error correction padding factor.

17. The communication apparatus of claim 12, wherein the one or more processors are further configured to execute the instructions to cause the communication apparatus to increase the fourth duration by 4 microseconds when the LDPC extra symbol segment condition is met, a requirement on a nominal packet padding capability of a receiver is not met after an LDPC extra symbol segment is added, a remaining duration is greater than or equal to 4 microseconds, and the fourth duration does not reach an allowed maximum duration, wherein the LDPC extra symbol segment condition is based on a pre-forward error correction padding factor, wherein the pre-forward error correction padding factor is based on the fourth duration before increasing by 4 microseconds and the nominal packet padding capability, and wherein the remaining duration is based on the third duration, the initial duration, the fifth duration, and the fourth duration before increasing by 4 microseconds.

18. A computer program product comprising computer-executable instructions that are stored on a non-transitory computer-readable medium and that, when executed by one or more processors, cause a communication apparatus to:

control a first duration of one or more of a packet extension (PE) field of a first physical layer protocol data unit (PPDU), an Extremely High Throughput signal (EHT-SIG) field of the PPDU, or an Extremely High Throughput long training field (EHT-LTF) field of the PPDU or delay a sending time of the PPDU to make an error between an end time of the PPDU and a first time be less than or equal to an error threshold, wherein the first time is a target end time of the PPDU; and either:

a) determine a first pre-forward error correction padding factor based on a second duration and the nominal packet padding capability, set a low-density parity check (LDPC) extra symbol segment condition based on the first pre-forward error correction padding factor, and set, when the LDPC extra symbol segment condition is met, an LDPC extra symbol segment field to be a first value, wherein the first value indicates that the LDPC extra symbol segment is to be added; or b) determine the first pre-forward error correction padding factor carried in the EHT-SIG field based on the second duration and the nominal packet padding capability, set the LDPC extra symbol segment condition based on the first pre-forward error correction padding factor, and set, when the LDPC extra symbol segment condition is not met, the LDPC extra symbol segment field to be a third value, wherein the third value indicates that the LDPC extra symbol segment is to be added; and send the PPDU.

19. The computer program product of claim 18, wherein the computer- executable instructions further cause the communication apparatus to determine a second duration of the PE field based on a third duration, a fourth duration of a preamble of the PPDU, and a fifth duration of a symbol in a data field of the PPDU, and wherein the third duration is between the first time and a start time of the PPDU.

20. The computer program product of claim 18, wherein the computer-executable instructions further cause the communication apparatus to determine a second duration of a padding part in the EHT-SIG field based on a third duration, an initial duration of a preamble of the PPDU, a fourth duration of the PE field, and a fifth duration of a symbol in a data field of the PPDU, wherein the initial duration does not comprise the second duration, wherein the third duration is between the first time and a start time of the PPDU, wherein the second duration is a multiple of 4 microseconds, wherein the preamble comprises the EHT-SIG field, and wherein the EHT-SIG field comprises an initial part and the padding part.

* * * * *